United States Patent
Wheeler

(10) Patent No.: US 10,579,336 B2
(45) Date of Patent: *Mar. 3, 2020

(54) DIVISION OPERATIONS FOR MEMORY

(71) Applicant: Micron Technology, Inc., Boise, ID (US)

(72) Inventor: Kyle B. Wheeler, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 16/105,383

(22) Filed: Aug. 20, 2018

(65) Prior Publication Data

US 2018/0357042 A1    Dec. 13, 2018

Related U.S. Application Data

(63) Continuation of application No. 15/194,164, filed on Jun. 27, 2016, now Pat. No. 10,055,196, which is a
(Continued)

(51) Int. Cl.
*G06F 7/535* (2006.01)
*G06F 5/01* (2006.01)

(52) U.S. Cl.
CPC ............. *G06F 7/535* (2013.01); *G06F 5/01* (2013.01); *G06F 2207/5353* (2013.01)

(58) Field of Classification Search
None
See application file for complete search history.

(56) References Cited

U.S. PATENT DOCUMENTS 4,380,046 A    4/1983 Fung
4,435,792 A    3/1984 Bechtolsheim
(Continued)

FOREIGN PATENT DOCUMENTS

CN    102141905    8/2011
EP     0214718     3/1987
(Continued)

OTHER PUBLICATIONS

Boyd et al., "On the General Applicability of Instruction-Set Randomization", Jul.-Sep. 2010, (14 pgs.), vol. 7, Issue 3, IEEE Transactions on Dependable and Secure Computing.
(Continued)

*Primary Examiner* — David H Malzahn
(74) *Attorney, Agent, or Firm* — Brooks, Cameron & Huebsch, PLLC

(57) ABSTRACT

Examples of the present disclosure provide apparatuses and methods for performing division operations in a memory. An example apparatus comprises a first address space comprising a first number of memory cells coupled to a sense line and to a first number of select lines wherein the first address space stores a dividend value. A second address space comprises a second number of memory cells coupled to the sense line and to a second number of select lines wherein the second address space stores a divisor value. A third address space comprises a third number of memory cells coupled to the sense line and to a third number of select lines wherein the third address space stores a remainder value. Sensing circuitry can be configured to receive the dividend value and the divisor value, divide the dividend value by the divisor value, and store a remainder result in the third number of memory cells.

19 Claims, 18 Drawing Sheets

Related U.S. Application Data continuation of application No. 14/075,539, filed on Nov. 8, 2013, now Pat. No. 9,430,191.

(56) References Cited

U.S. PATENT DOCUMENTS

| | | |
|---|---|---|
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Klidaka |
| 6,173,305 B1 | 1/2001 | Poland |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Harnade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shinano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |

(56) References Cited

U.S. PATENT DOCUMENTS

| | | |
|---|---|---|
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 9,430,191 B2* | 8/2016 | Wheeler .................. G06F 5/01 |
| 9,910,637 B2* | 3/2018 | Tiwari ................... G06F 7/535 |
| 10,055,196 B2* | 8/2018 | Wheeler .................. G06F 5/01 |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0281371 A1 | 9/2014 | Thantry et al. |
| 2014/0344934 A1 | 11/2014 | Jorgensen |
| 2015/0134713 A1 | 5/2015 | Wheeler |
| 2015/0324290 A1 | 11/2015 | Leidel |
| 2015/0325272 A1 | 11/2015 | Murphy |
| 2016/0062673 A1* | 3/2016 | Tiwari .................. G06F 12/02 711/154 |
| 2016/0266873 A1* | 9/2016 | Tiwari ................. G11C 7/1006 |
| 2016/0306609 A1* | 10/2016 | Wheeler .................. G06F 5/01 |
| 2017/0269903 A1* | 9/2017 | Tiwari .................. G06F 7/535 |
| 2017/0329577 A1* | 11/2017 | Tiwari .................. G06F 7/535 |
| 2018/0203671 A1* | 7/2018 | Tiwari .................. G06F 7/535 |
| 2018/0357042 A1* | 12/2018 | Wheeler .................. G06F 5/01 |

FOREIGN PATENT DOCUMENTS

| | | |
|---|---|---|
| EP | 2026209 | 2/2009 |
| GB | 2444790 | 6/2008 |
| JP | H0298892 | 4/1990 |
| JP | H0831168 | 2/1996 |
| JP | 2004158170 | 6/2004 |
| JP | 2006127460 | 5/2006 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Stojmenovic, "Multiplicative Circulant Networks Topological Properties and Communication Algorithms", (25 pgs.), Discrete Applied Mathematics 77 (1997) 281-305.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

(56) References Cited

OTHER PUBLICATIONS

Debnath, Biplob, Bloomflash: Bloom Filter on Flash-Based Storage, 2011 31st Annual Conference on Distributed Computing Systems, Jun. 20-24, 2011, 10 pgs.
Pagiamtzis, Kostas, "Content-Addressable Memory Introduction", Jun. 25, 2007, (6 pgs.), retrieved from: http://www.pagiamtzis.com/cam/camintro.
Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.
International Search Report and Written Opinion for PCT Application No. PCT/US2013/043702, dated Sep. 26, 2013, (11 pgs.).
Elliot, et al., "Computational RAM: Implementing Processors in Memory", Jan.-Mar. 1999, (10 pgs.), vol. 16, Issue 1, IEEE Design and Test of Computers Magazine.
Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.
Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.
Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.
Dibi, et al, "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.
U.S. Appl. No. 13/449,082, entitled, "Methods and Apparatus for Pattern Matching," filed Apr. 17, 2012, (37 pgs.).
U.S. Appl. No. 13/743,686, entitled, "Weighted Search and Compare in a Memory Device," filed Jan. 17, 2013, (25 pgs.).
U.S. Appl. No. 13/774,636, entitled, "Memory as a Programmable Logic Device," filed Feb. 22, 2013, (30 pgs.).
U.S. Appl. No. 13/774,553, entitled, "Neural Network in a Memory Device," filed Feb. 22, 2013, (63 pgs.).
U.S. Appl. No. 13/796,189, entitled, "Performing Complex Arithmetic Functions in a Memory Device," filed Mar. 12, 2013, (23 pgs.).
Office Action for related Japan Patent Application No. 2016-527212, dated Apr. 18, 2017, 6 pages.
Supplementary European Search Report for related EP Patent Application No. 14860497.8, dated Jun. 8, 2017, 6 pages.
Efnusheva, et al., "A Novel Memory-centric Architecture and Organization of Processors and Computers", Proc. of the 3rd International Conference on Applied Innovations in IT, CAIIT, Mar. 2015.
Morad, et al., "GP-SIMD Processing-in-Memory", ACM Transactions on Architecture and Code Optimization, vol. 11, No. 4, Article 53, Jan. 2015.

* cited by examiner

|  | | 330 ⟶ | | MEMORY ARRAY | | | | |
|---|---|---|---|---|---|---|---|---|
| | | 320-0 | 320-1 | 320-2 | 320-3 | 320-4 | 320-5 |
| DIVIDEND INITIAL VALUES | | 5 | 7 | 3 | 6 | 8 | 12 |
| 4-BIT DIVIDEND (BIT ROWS) | 304-0 | 1 | 1 | 1 | 0 | 0 | 0 |
| | 304-1 | 0 | 1 | 1 | 1 | 0 | 0 |
| | 304-2 | 1 | 1 | 0 | 1 | 0 | 1 |
| | 304-3 | 0 | 0 | 0 | 0 | 1 | 1 |
| | | 322-0 | 322-1 | 322-2 | 322-3 | 322-4 | 322-5 |
| DIVISOR INITIAL VALUES | | 4 | 2 | 1 | 3 | 5 | 6 |
| 4-BIT DIVISOR (BIT ROWS) | 304-4 | 0 | 0 | 1 | 1 | 1 | 0 |
| | 304-5 | 0 | 1 | 0 | 1 | 0 | 1 |
| | 304-6 | 1 | 0 | 0 | 0 | 1 | 1 |
| | 304-7 | 0 | 0 | 0 | 0 | 0 | 0 |
| | | 324-0 | 324-1 | 324-2 | 324-3 | 324-4 | 324-5 |
| QUOTIENT INITIAL VALUES | | 0 | 0 | 0 | 0 | 0 | 0 |
| 4-BIT QUOTIENT (BIT ROWS) | 304-8 | 0 | 0 | 0 | 0 | 0 | 0 |
| | 304-9 | 0 | 0 | 0 | 0 | 0 | 0 |
| | 304-10 | 0 | 0 | 0 | 0 | 0 | 0 |
| | 304-11 | 0 | 0 | 0 | 0 | 0 | 0 |
| | | 326-0 | 326-1 | 326-2 | 326-3 | 326-4 | 326-5 |
| REMAINDER INITIAL VALUES | | 0 | 0 | 0 | 0 | 0 | 0 |
| 4-BIT REMAINDER (BIT ROWS) | 304-12 | 0 | 0 | 0 | 0 | 0 | 0 |
| | 304-13 | 0 | 0 | 0 | 0 | 0 | 0 |
| | 304-14 | 0 | 0 | 0 | 0 | 0 | 0 |
| | 304-15 | 0 | 0 | 0 | 0 | 0 | 0 |
| | | 328-0 | 328-1 | 328-2 | 328-3 | 328-4 | 328-5 |
| MASK ROW | 304-16 | 0 | 0 | 0 | 0 | 0 | 0 |
| | | 305-0 | 305-1 | 305-2 | 305-3 | 305-4 | 305-5 |

*Fig. 3A*

|  | 330 ⟶ | MEMORY ARRAY | | | | |
|---|---|---|---|---|---|---|
| | | 320-0 | 320-1 | 320-2 | 320-3 | 320-4 | 320-5 |

DIVIDEND INITIAL VALUES
4-BIT DIVIDEND (BIT ROWS)

| | 320-0 | 320-1 | 320-2 | 320-3 | 320-4 | 320-5 |
|---|---|---|---|---|---|---|
| | 5 | 7 | 3 | 6 | 8 | 12 |
| 304-0 | 1 | 1 | 1 | 0 | 0 | 0 |
| 304-1 | 0 | 1 | 1 | 1 | 0 | 0 |
| 304-2 | 1 | 1 | 0 | 1 | 0 | 1 |
| 304-3 | 0 | 0 | 0 | 0 | 1 | 1 |

DIVISOR INITIAL VALUES
4-BIT DIVISOR (BIT ROWS)

| | 322-0 | 322-1 | 322-2 | 322-3 | 322-4 | 322-5 |
|---|---|---|---|---|---|---|
| | 4 | 2 | 1 | 3 | 5 | 6 |
| 304-4 | 0 | 0 | 1 | 1 | 1 | 0 |
| 304-5 | 0 | 1 | 0 | 1 | 0 | 1 |
| 304-6 | 1 | 0 | 0 | 0 | 1 | 1 |
| 304-7 | 0 | 0 | 0 | 0 | 0 | 0 |

QUOTIENT VALUES
4-BIT QUOTIENT (BIT ROWS)

| | 324-0 | 324-1 | 324-2 | 324-3 | 324-4 | 324-5 |
|---|---|---|---|---|---|---|
| | 0 | 0 | 0 | 0 | 0 | 0 |
| 304-8 | 0 | 0 | 0 | 0 | 0 | 0 |
| 304-9 | 0 | 0 | 0 | 0 | 0 | 0 |
| 304-10 | 0 | 0 | 0 | 0 | 0 | 0 |
| 304-11 | 0 | 0 | 0 | 0 | 0 | 0 |

REMAINDER VALUES
4-BIT REMAINDER (BIT ROWS)

| | 326-0 | 326-1 | 326-2 | 326-3 | 326-4 | 326-5 |
|---|---|---|---|---|---|---|
| | 0 | 0 | 0 | 0 | 1 | 1 |
| 304-12 | 0 | 0 | 0 | 0 | 1 | 1 |
| 304-13 | 0 | 0 | 0 | 0 | 0 | 0 |
| 304-14 | 0 | 0 | 0 | 0 | 0 | 0 |
| 304-15 | 0 | 0 | 0 | 0 | 0 | 0 |

MASK ROW

| | 328-0 | 328-1 | 328-2 | 328-3 | 328-4 | 328-5 |
|---|---|---|---|---|---|---|
| 304-16 | 0 | 0 | 0 | 0 | 0 | 0 |

330 → MEMORY ARRAY

DIVIDEND INITIAL VALUES
4-BIT DIVIDEND (BIT ROWS)

|  | 320-0 | 320-1 | 320-2 | 320-3 | 320-4 | 320-5 |
|---|---|---|---|---|---|---|
|  | 5 | 7 | 3 | 6 | 8 | 12 |
| 304-0 | 1 | 1 | 1 | 0 | 0 | 0 |
| 304-1 | 0 | 1 | 1 | 1 | 0 | 0 |
| 304-2 | 1 | 1 | 0 | 1 | 0 | 1 |
| 304-3 | 0 | 0 | 0 | 0 | 1 | 1 |

DIVISOR INITIAL VALUES
4-BIT DIVISOR (BIT ROWS)

|  | 322-0 | 322-1 | 322-2 | 322-3 | 322-4 | 322-5 |
|---|---|---|---|---|---|---|
|  | 4 | 2 | 1 | 3 | 5 | 6 |
| 304-4 | 0 | 0 | 1 | 1 | 1 | 0 |
| 304-5 | 0 | 1 | 0 | 1 | 0 | 1 |
| 304-6 | 1 | 0 | 0 | 0 | 1 | 1 |
| 304-7 | 0 | 0 | 0 | 0 | 0 | 0 |

QUOTIENT VALUES
4-BIT QUOTIENT (BIT ROWS)

|  | 324-0 | 324-1 | 324-2 | 324-3 | 324-4 | 324-5 |
|---|---|---|---|---|---|---|
|  | 0 | 0 | 0 | 0 | 0 | 0 |
| 304-8 | 0 | 0 | 0 | 0 | 0 | 0 |
| 304-9 | 0 | 0 | 0 | 0 | 0 | 0 |
| 304-10 | 0 | 0 | 0 | 0 | 0 | 0 |
| 304-11 | 0 | 0 | 0 | 0 | 0 | 0 |

REMAINDER VALUES
4-BIT REMAINDER (BIT ROWS)

|  | 326-0 | 326-1 | 326-2 | 326-3 | 326-4 | 326-5 |
|---|---|---|---|---|---|---|
|  | 0 | 0 | 0 | 0 | 1 | 1 |
| 304-12 | 0 | 0 | 0 | 0 | 1 | 1 |
| 304-13 | 0 | 0 | 0 | 0 | 0 | 0 |
| 304-14 | 0 | 0 | 0 | 0 | 0 | 0 |
| 304-15 | 0 | 0 | 0 | 0 | 0 | 0 |

MASK ROW

|  | 328-0 | 328-1 | 328-2 | 328-3 | 328-4 | 328-5 |
|---|---|---|---|---|---|---|
| 304-16 | 0 | 0 | 0 | 0 | 0 | 0 |

MEMORY ARRAY

330 →

|  | | 320-0 | 320-1 | 320-2 | 320-3 | 320-4 | 320-5 |
|---|---|---|---|---|---|---|---|
| DIVIDEND INITIAL VALUES | | 5 | 7 | 3 | 6 | 8 | 12 |
| 4-BIT DIVIDEND (BIT ROWS) | 304-0 | 1 | 1 | 1 | 0 | 0 | 0 |
|  | 304-1 | 0 | 1 | 1 | 1 | 0 | 0 |
|  | 304-2 | 1 | 1 | 0 | 1 | 0 | 1 |
|  | 304-3 | 0 | 0 | 0 | 0 | 1 | 1 |

|  | | 322-0 | 322-1 | 322-2 | 322-3 | 322-4 | 322-5 |
|---|---|---|---|---|---|---|---|
| DIVISOR INITIAL VALUES | | 4 | 2 | 1 | 3 | 5 | 6 |
| 4-BIT DIVISOR (BIT ROWS) | 304-4 | 0 | 0 | 1 | 1 | 1 | 0 |
|  | 304-5 | 0 | 1 | 0 | 1 | 0 | 1 |
|  | 304-6 | 1 | 0 | 0 | 0 | 1 | 1 |
|  | 304-7 | 0 | 0 | 0 | 0 | 0 | 0 |

|  | | 324-0 | 324-1 | 324-2 | 324-3 | 324-4 | 324-5 |
|---|---|---|---|---|---|---|---|
| QUOTIENT VALUES | | 0 | 0 | 0 | 0 | 0 | 0 |
| 4-BIT QUOTIENT (BIT ROWS) | 304-8 | 0 | 0 | 0 | 0 | 0 | 0 |
|  | 304-9 | 0 | 0 | 0 | 0 | 0 | 0 |
|  | 304-10 | 0 | 0 | 0 | 0 | 0 | 0 |
|  | 304-11 | 0 | 0 | 0 | 0 | 0 | 0 |

|  | | 326-0 | 326-1 | 326-2 | 326-3 | 326-4 | 326-5 |
|---|---|---|---|---|---|---|---|
| REMAINDER VALUES | | 0 | 0 | 0 | 0 | 1 | 1 |
| 4-BIT REMAINDER (BIT ROWS) | 304-12 | 0 | 0 | 0 | 0 | 1 | 1 |
|  | 304-13 | 0 | 0 | 0 | 0 | 0 | 0 |
|  | 304-14 | 0 | 0 | 0 | 0 | 0 | 0 |
|  | 304-15 | 0 | 0 | 0 | 0 | 0 | 0 |

|  | | 328-0 | 328-1 | 328-2 | 328-3 | 328-4 | 328-5 |
|---|---|---|---|---|---|---|---|
| MASK ROW | 304-16 | 0 | 0 | 0 | 0 | 0 | 0 |

MEMORY ARRAY 330

| | | 320-0 | 320-1 | 320-2 | 320-3 | 320-4 | 320-5 |
|---|---|---|---|---|---|---|---|
| DIVIDEND INITIAL VALUES | | 5 | 7 | 3 | 6 | 8 | 12 |
| 4-BIT DIVIDEND (BIT ROWS) | 304-0 | 1 | 1 | 1 | 0 | 0 | 0 |
| | 304-1 | 0 | 1 | 1 | 1 | 0 | 0 |
| | 304-2 | 1 | 1 | 0 | 1 | 0 | 1 |
| | 304-3 | 0 | 0 | 0 | 0 | 1 | 1 |

| | | 322-0 | 322-1 | 322-2 | 322-3 | 322-4 | 322-5 |
|---|---|---|---|---|---|---|---|
| DIVISOR INITIAL VALUES | | 4 | 2 | 1 | 3 | 5 | 6 |
| 4-BIT DIVISOR (BIT ROWS) | 304-4 | 0 | 0 | 1 | 1 | 1 | 0 |
| | 304-5 | 0 | 1 | 0 | 1 | 0 | 1 |
| | 304-6 | 1 | 0 | 0 | 0 | 1 | 1 |
| | 304-7 | 0 | 0 | 0 | 0 | 0 | 0 |

| | | 324-0 | 324-1 | 324-2 | 324-3 | 324-4 | 324-5 |
|---|---|---|---|---|---|---|---|
| QUOTIENT VALUES | | 0 | 0 | 0 | 0 | 0 | 0 |
| 4-BIT QUOTIENT (BIT ROWS) | 304-8 | 0 | 0 | 0 | 0 | 0 | 0 |
| | 304-9 | 0 | 0 | 0 | 0 | 0 | 0 |
| | 304-10 | 0 | 0 | 0 | 0 | 0 | 0 |
| | 304-11 | 0 | 0 | 0 | 0 | 0 | 0 |

| | | 326-0 | 326-1 | 326-2 | 326-3 | 326-4 | 326-5 |
|---|---|---|---|---|---|---|---|
| REMAINDER VALUES | | 0 | 0 | 0 | 0 | 2 | 2 |
| 4-BIT REMAINDER (BIT ROWS) | 304-12 | 0 | 0 | 0 | 0 | 0 | 0 |
| | 304-13 | 0 | 0 | 0 | 0 | 1 | 1 |
| | 304-14 | 0 | 0 | 0 | 0 | 0 | 0 |
| | 304-15 | 0 | 0 | 0 | 0 | 0 | 0 |

| | | 328-0 | 328-1 | 328-2 | 328-3 | 328-4 | 328-5 |
|---|---|---|---|---|---|---|---|
| MASK ROW | 304-16 | 0 | 0 | 0 | 0 | 0 | 0 |

330 → MEMORY ARRAY

DIVIDEND INITIAL VALUES
4-BIT DIVIDEND (BIT ROWS)

|  | 320-0 | 320-1 | 320-2 | 320-3 | 320-4 | 320-5 |
|---|---|---|---|---|---|---|
|  | 5 | 7 | 3 | 6 | 8 | 12 |
| 304-0 | 1 | 1 | 1 | 0 | 0 | 0 |
| 304-1 | 0 | 1 | 1 | 1 | 0 | 0 |
| 304-2 | 1 | 1 | 0 | 1 | 0 | 1 |
| 304-3 | 0 | 0 | 0 | 0 | 1 | 1 |

DIVISOR INITIAL VALUES
4-BIT DIVISOR (BIT ROWS)

|  | 322-0 | 322-1 | 322-2 | 322-3 | 322-4 | 322-5 |
|---|---|---|---|---|---|---|
|  | 4 | 2 | 1 | 3 | 5 | 6 |
| 304-4 | 0 | 0 | 1 | 1 | 1 | 0 |
| 304-5 | 0 | 1 | 0 | 1 | 0 | 1 |
| 304-6 | 1 | 0 | 0 | 0 | 1 | 1 |
| 304-7 | 0 | 0 | 0 | 0 | 0 | 0 |

QUOTIENT VALUES
4-BIT QUOTIENT (BIT ROWS)

|  | 324-0 | 324-1 | 324-2 | 324-3 | 324-4 | 324-5 |
|---|---|---|---|---|---|---|
|  | 0 | 1 | 1 | 1 | 0 | 1 |
| 304-8 | 0 | 1 | 1 | 1 | 0 | 1 |
| 304-9 | 0 | 0 | 0 | 0 | 0 | 0 |
| 304-10 | 0 | 0 | 0 | 0 | 0 | 0 |
| 304-11 | 0 | 0 | 0 | 0 | 0 | 0 |

REMAINDER VALUES
4-BIT REMAINDER (BIT ROWS)

|  | 326-0 | 326-1 | 326-2 | 326-3 | 326-4 | 326-5 |
|---|---|---|---|---|---|---|
|  | 5 | 3 | 1 | 0 | 8 | 0 |
| 304-12 | 1 | 1 | 1 | 0 | 0 | 0 |
| 304-13 | 0 | 1 | 0 | 0 | 0 | 0 |
| 304-14 | 1 | 0 | 0 | 0 | 0 | 0 |
| 304-15 | 0 | 0 | 0 | 0 | 1 | 0 |

MASK ROW

|  | 328-0 | 328-1 | 328-2 | 328-3 | 328-4 | 328-5 |
|---|---|---|---|---|---|---|
| 304-16 | 0 | 1 | 1 | 1 | 0 | 1 |

330 → MEMORY ARRAY

| | | 320-0 | 320-1 | 320-2 | 320-3 | 320-4 | 320-5 |
|---|---|---|---|---|---|---|---|
| DIVIDEND INITIAL VALUES | | 5 | 7 | 3 | 6 | 8 | 12 |
| 4-BIT DIVIDEND (BIT ROWS) | 304-0 | 1 | 1 | 1 | 0 | 0 | 0 |
| | 304-1 | 0 | 1 | 1 | 1 | 0 | 0 |
| | 304-2 | 1 | 1 | 0 | 1 | 0 | 1 |
| | 304-3 | 0 | 0 | 0 | 0 | 1 | 1 |

| | | 322-0 | 322-1 | 322-2 | 322-3 | 322-4 | 322-5 |
|---|---|---|---|---|---|---|---|
| DIVISOR INITIAL VALUES | | 4 | 2 | 1 | 3 | 5 | 6 |
| 4-BIT DIVISOR (BIT ROWS) | 304-4 | 0 | 0 | 1 | 1 | 1 | 0 |
| | 304-5 | 0 | 1 | 0 | 1 | 0 | 1 |
| | 304-6 | 1 | 0 | 0 | 0 | 1 | 1 |
| | 304-7 | 0 | 0 | 0 | 0 | 0 | 0 |

| | | 324-0 | 324-1 | 324-2 | 324-3 | 324-4 | 324-5 |
|---|---|---|---|---|---|---|---|
| QUOTIENT VALUES | | 0 | 1 | 1 | 1 | 0 | 1 |
| 4-BIT QUOTIENT (BIT ROWS) | 304-8 | 0 | 1 | 1 | 1 | 0 | 1 |
| | 304-9 | 0 | 0 | 0 | 0 | 0 | 0 |
| | 304-10 | 0 | 0 | 0 | 0 | 0 | 0 |
| | 304-11 | 0 | 0 | 0 | 0 | 0 | 0 |

| | | 326-0 | 326-1 | 326-2 | 326-3 | 326-4 | 326-5 |
|---|---|---|---|---|---|---|---|
| REMAINDER VALUES | | 5 | 3 | 1 | 0 | 8 | 0 |
| 4-BIT REMAINDER (BIT ROWS) | 304-12 | 1 | 1 | 1 | 0 | 0 | 0 |
| | 304-13 | 0 | 1 | 0 | 0 | 0 | 0 |
| | 304-14 | 1 | 0 | 0 | 0 | 0 | 0 |
| | 304-15 | 0 | 0 | 0 | 0 | 1 | 0 |

| | | 328-0 | 328-1 | 328-2 | 328-3 | 328-4 | 328-5 |
|---|---|---|---|---|---|---|---|
| MASK ROW | 304-16 | 1 | 1 | 1 | 0 | 1 | 0 |
| | | 305-0 | 305-1 | 305-2 | 305-3 | 305-4 | 305-5 |

*Fig. 3G*

|  | | 320-0 | 320-1 | 320-2 | 320-3 | 320-4 | 320-5 |
|---|---|---|---|---|---|---|---|
| DIVIDEND INITIAL VALUES | | 5 | 7 | 3 | 6 | 8 | 12 |
| 4-BIT DIVIDEND (BIT ROWS) | 304-0 | 1 | 1 | 1 | 0 | 0 | 0 |
| | 304-1 | 0 | 1 | 1 | 1 | 0 | 0 |
| | 304-2 | 1 | 1 | 0 | 1 | 0 | 1 |
| | 304-3 | 0 | 0 | 0 | 0 | 1 | 1 |

|  | | 322-0 | 322-1 | 322-2 | 322-3 | 322-4 | 322-5 |
|---|---|---|---|---|---|---|---|
| DIVISOR INITIAL VALUES | | 4 | 2 | 1 | 3 | 5 | 6 |
| 4-BIT DIVISOR (BIT ROWS) | 304-4 | 0 | 0 | 1 | 1 | 1 | 0 |
| | 304-5 | 0 | 1 | 0 | 1 | 0 | 1 |
| | 304-6 | 1 | 0 | 0 | 0 | 1 | 1 |
| | 304-7 | 0 | 0 | 0 | 0 | 0 | 0 |

|  | | 324-0 | 324-1 | 324-2 | 324-3 | 324-4 | 324-5 |
|---|---|---|---|---|---|---|---|
| QUOTIENT VALUES | | 0 | 1 | 1 | 1 | 0 | 1 |
| 4-BIT QUOTIENT (BIT ROWS) | 304-8 | 0 | 1 | 1 | 1 | 0 | 1 |
| | 304-9 | 0 | 0 | 0 | 0 | 0 | 0 |
| | 304-10 | 0 | 0 | 0 | 0 | 0 | 0 |
| | 304-11 | 0 | 0 | 0 | 0 | 0 | 0 |

|  | | 326-0 | 326-1 | 326-2 | 326-3 | 326-4 | 326-5 |
|---|---|---|---|---|---|---|---|
| REMAINDER VALUES | | 1 | 1 | 0 | 0 | 3 | 0 |
| 4-BIT REMAINDER (BIT ROWS) | 304-12 | 1 | 1 | 0 | 0 | 1 | 0 |
| | 304-13 | 0 | 0 | 0 | 0 | 1 | 0 |
| | 304-14 | 0 | 0 | 0 | 0 | 0 | 0 |
| | 304-15 | 0 | 0 | 0 | 0 | 0 | 0 |

|  | | 328-0 | 328-1 | 328-2 | 328-3 | 328-4 | 328-5 |
|---|---|---|---|---|---|---|---|
| MASK ROW | 304-16 | 1 | 1 | 1 | 0 | 1 | 0 |
| | | 305-0 | 305-1 | 305-2 | 305-3 | 305-4 | 305-5 |

330 — MEMORY ARRAY

*Fig. 3H*

MEMORY ARRAY 330

| | | 320-0 | 320-1 | 320-2 | 320-3 | 320-4 | 320-5 |
|---|---|---|---|---|---|---|---|
| DIVIDEND INITIAL VALUES | | 5 | 7 | 3 | 6 | 8 | 12 |
| 4-BIT DIVIDEND (BIT ROWS) | 304-0 | 1 | 1 | 1 | 0 | 0 | 0 |
| | 304-1 | 0 | 1 | 1 | 1 | 0 | 0 |
| | 304-2 | 1 | 1 | 0 | 1 | 0 | 1 |
| | 304-3 | 0 | 0 | 0 | 0 | 1 | 1 |

| | | 322-0 | 322-1 | 322-2 | 322-3 | 322-4 | 322-5 |
|---|---|---|---|---|---|---|---|
| DIVISOR INITIAL VALUES | | 4 | 2 | 1 | 3 | 5 | 6 |
| 4-BIT DIVISOR (BIT ROWS) | 304-4 | 0 | 0 | 1 | 1 | 1 | 0 |
| | 304-5 | 0 | 1 | 0 | 1 | 0 | 1 |
| | 304-6 | 1 | 0 | 0 | 0 | 1 | 1 |
| | 304-7 | 0 | 0 | 0 | 0 | 0 | 0 |

| | | 324-0 | 324-1 | 324-2 | 324-3 | 324-4 | 324-5 |
|---|---|---|---|---|---|---|---|
| QUOTIENT VALUES | | 1 | 3 | 3 | 1 | 1 | 1 |
| 4-BIT QUOTIENT (BIT ROWS) | 304-8 | 1 | 1 | 1 | 1 | 1 | 1 |
| | 304-9 | 0 | 1 | 1 | 0 | 0 | 0 |
| | 304-10 | 0 | 0 | 0 | 0 | 0 | 0 |
| | 304-11 | 0 | 0 | 0 | 0 | 0 | 0 |

| | | 326-0 | 326-1 | 326-2 | 326-3 | 326-4 | 326-5 |
|---|---|---|---|---|---|---|---|
| REMAINDER VALUES | | 1 | 1 | 0 | 0 | 3 | 0 |
| 4-BIT REMAINDER (BIT ROWS) | 304-12 | 1 | 1 | 0 | 0 | 1 | 0 |
| | 304-13 | 0 | 0 | 0 | 0 | 1 | 0 |
| | 304-14 | 0 | 0 | 0 | 0 | 0 | 0 |
| | 304-15 | 0 | 0 | 0 | 0 | 0 | 0 |

| | | 328-0 | 328-1 | 328-2 | 328-3 | 328-4 | 328-5 |
|---|---|---|---|---|---|---|---|
| MASK ROW | 304-16 | 1 | 1 | 1 | 0 | 1 | 0 |
| | | 305-0 | 305-1 | 305-2 | 305-3 | 305-4 | 305-5 |

*Fig. 3I*

330→            MEMORY ARRAY

⎧320-0  ⎧320-1  ⎧320-2  ⎧320-3  ⎧320-4  ⎧320-5
DIVIDEND INITIAL VALUES              5       7       3       6       8       12
4-BIT DIVIDEND (BIT ROWS)   304-0⎯ 1       1       1       0       0       0
                            304-1⎯ 0       1       1       1       0       0
                            304-2⎯ 1       1       0       1       0       1
                            304-3⎯ 0       0       0       0       1       1

⎧322-0  ⎧322-1  ⎧322-2  ⎧322-3  ⎧322-4  ⎧322-5
DIVISOR INITIAL VALUES               4       2       1       3       5       6
4-BIT DIVISOR (BIT ROWS)    304-4⎯ 0       0       1       1       1       0
                            304-5⎯ 0       1       0       1       0       1
                            304-6⎯ 1       0       0       0       1       1
                            304-7⎯ 0       0       0       0       0       0

⎧324-0  ⎧324-1  ⎧324-2  ⎧324-3  ⎧324-4  ⎧324-5
QUOTIENT VALUES                      1       3       3       2       1       2
4-BIT QUOTIENT (BIT ROWS)   304-8⎯ 1       1       1       0       1       0
                            304-9⎯ 0       1       1       1       0       1
                            304-10⎯ 0       0       0       0       0       0
                            304-11⎯ 0       0       0       0       0       0

⎧326-0  ⎧326-1  ⎧326-2  ⎧326-3  ⎧326-4  ⎧326-5
REMAINDER VALUES                     1       1       0       0       3       0
4-BIT REMAINDER (BIT ROWS)  304-12⎯ 1       1       0       0       1       0
                            304-13⎯ 0       0       0       0       1       0
                            304-14⎯ 0       0       0       0       0       0
                            304-15⎯ 0       0       0       0       0       0

⎧328-0  ⎧328-1  ⎧328-2  ⎧328-3  ⎧328-4  ⎧328-5
MASK ROW                    304-16⎯ 1       1       1       0       1       0
                                    ↑       ↑       ↑       ↑       ↑       ↑
                                    305-0   305-1   305-2   305-3   305-4   305-5

*Fig. 3J*

330 ⟶ MEMORY ARRAY

DIVIDEND INITIAL VALUES
4-BIT DIVIDEND (BIT ROWS)

| | 320-0 | 320-1 | 320-2 | 320-3 | 320-4 | 320-5 |
|---|---|---|---|---|---|---|
| | 5 | 7 | 3 | 6 | 8 | 12 |
| 304-0 | 1 | 1 | 1 | 0 | 0 | 0 |
| 304-1 | 0 | 1 | 1 | 1 | 0 | 0 |
| 304-2 | 1 | 1 | 0 | 1 | 0 | 1 |
| 304-3 | 0 | 0 | 0 | 0 | 1 | 1 |

DIVISOR INITIAL VALUES
4-BIT DIVISOR (BIT ROWS)

| | 322-0 | 322-1 | 322-2 | 322-3 | 322-4 | 322-5 |
|---|---|---|---|---|---|---|
| | 4 | 2 | 1 | 3 | 5 | 6 |
| 304-4 | 0 | 0 | 1 | 1 | 1 | 0 |
| 304-5 | 0 | 1 | 0 | 1 | 0 | 1 |
| 304-6 | 1 | 0 | 0 | 0 | 1 | 1 |
| 304-7 | 0 | 0 | 0 | 0 | 0 | 0 |

QUOTIENT VALUES
4-BIT QUOTIENT (BIT ROWS)

| | 324-0 | 324-1 | 324-2 | 324-3 | 324-4 | 324-5 |
|---|---|---|---|---|---|---|
| | 1 | 3 | 3 | 2 | 1 | 2 |
| 304-8 | 1 | 1 | 1 | 0 | 1 | 0 |
| 304-9 | 0 | 1 | 1 | 1 | 0 | 1 |
| 304-10 | 0 | 0 | 0 | 0 | 0 | 0 |
| 304-11 | 0 | 0 | 0 | 0 | 0 | 0 |

REMAINDER VALUES
4-BIT REMAINDER (BIT ROWS)

| | 326-0 | 326-1 | 326-2 | 326-3 | 326-4 | 326-5 |
|---|---|---|---|---|---|---|
| | 1 | 1 | 0 | 0 | 3 | 0 |
| 304-12 | 1 | 1 | 0 | 0 | 1 | 0 |
| 304-13 | 0 | 0 | 0 | 0 | 1 | 0 |
| 304-14 | 0 | 0 | 0 | 0 | 0 | 0 |
| 304-15 | 0 | 0 | 0 | 0 | 0 | 0 |

MASK ROW

| | 328-0 | 328-1 | 328-2 | 328-3 | 328-4 | 328-5 |
|---|---|---|---|---|---|---|
| 304-16 | 1 | 1 | 1 | 0 | 1 | 0 |
| | 305-0 | 305-1 | 305-2 | 305-3 | 305-4 | 305-5 |

*Fig. 3K*

DIVISION OPERATIONS FOR MEMORY

PRIORITY INFORMATION

This application is a Continuation of U.S. application Ser. No. 15/194,164, filed Jun. 27, 2016, which issues as U.S. Pat. No. 10,055,196 on Aug. 21, 2018, which is a Continuation of U.S. application Ser. No. 14/075,539, filed Nov. 8, 2013, which issued as U.S. Pat. No. 9,430,191 on Aug. 30, 2016, the contents of which are included herein by reference.

TECHNICAL FIELD

The present disclosure relates generally to semiconductor memory apparatuses and methods, and more particularly, to apparatuses and methods related to division operations for memory.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Electronic systems often include a number of processing resources (e.g., one or more processors), which may retrieve and execute instructions and store the results of the executed instructions to a suitable location. A processor can comprise a number of functional unit (e.g., herein referred to as functional unit circuitry (FUC)) such as arithmetic logic unit (ALU) circuitry, floating point unit (FPU) circuitry, and/or a combinatorial logic block, for example, which can be used to execute instructions by performing logical operations such as AND, OR, NOT, NAND, NOR, and XOR logical operations on data (e.g., one or more operands).

A number of components in an electronic system may be involved in providing instructions to the FUC for execution. The instructions may be generated, for instance, by a processing resource such as a controller and/or host processor. Data (e.g., the operands on which the instructions will be executed) may be stored in a memory array that is accessible by the FUC. The instructions and/or data may be retrieved from the memory array and sequenced and/or buffered before the FUC begins to execute instructions on the data. Furthermore, as different types of operations may be executed in one or multiple clock cycles through the FUC, intermediate results of the instructions and/or data may also be sequenced and/or buffered.

In many instances, the processing resources (e.g., processor and/or associated FUC) may be external to the memory array, and data can be accessed via a bus between the processing resources and the memory array (e.g., to execute instructions). Data can be moved from the memory array to registers external to the memory array via a bus.

BRIEF DESCRIPTION OF THE DRAWINGS

FIGS. 2C-1 and 2C-2 illustrate timing diagrams associated with performing a number of logical operations using sensing circuitry in accordance with a number of embodiments of the present disclosure.

FIGS. 2D-1 and 2D-2 illustrate timing diagrams associated with performing a number of logical operations using sensing circuitry in accordance with a number of embodiments of the present disclosure.

FIG. 3A illustrates a logical diagram showing the states of cells of a portion of an array at a particular phase associated with performing a serial division operation in accordance with a number of embodiments of the present disclosure.

FIG. 3B illustrates a logical diagram showing the states of cells of a portion of an array at a particular phase associated with performing a serial division operation in accordance with a number of embodiments of the present disclosure.

FIG. 3C illustrates a logical diagram showing the states of cells of a portion of an array at a particular phase associated with performing a serial division operation in accordance with a number of embodiments of the present disclosure.

FIG. 3D illustrates a logical diagram showing the states of cells of a portion of an array at a particular phase associated with performing a serial division operation in accordance with a number of embodiments of the present disclosure.

FIG. 3E illustrates a logical diagram showing the states of cells of a portion of an array at a particular phase associated with performing a serial division operation in accordance with a number of embodiments of the present disclosure.

FIG. 3F illustrates a logical diagram showing the states of cells of a portion of an array at a particular phase associated with performing a serial division operation in accordance with a number of embodiments of the present disclosure.

FIG. 3G illustrates a logical diagram showing the states of cells of a portion of an array at a particular phase associated with performing a serial division operation in accordance with a number of embodiments of the present disclosure.

FIG. 3H illustrates a logical diagram showing the states of cells of a portion of an array at a particular phase associated with performing a serial division operation in accordance with a number of embodiments of the present disclosure.

FIG. 3I illustrates a logical diagram showing the states of cells of a portion of an array at a particular phase associated with performing a serial division operation in accordance with a number of embodiments of the present disclosure.

FIG. 3J illustrates a logical diagram showing the states of cells of a portion of an array at a particular phase associated with performing a serial division operation in accordance with a number of embodiments of the present disclosure.

FIG. 3K illustrates a logical diagram showing the states of cells of a portion of an array at a particular phase associated with performing a serial division operation in accordance with a number of embodiments of the present disclosure.

DETAILED DESCRIPTION

Figure 1:
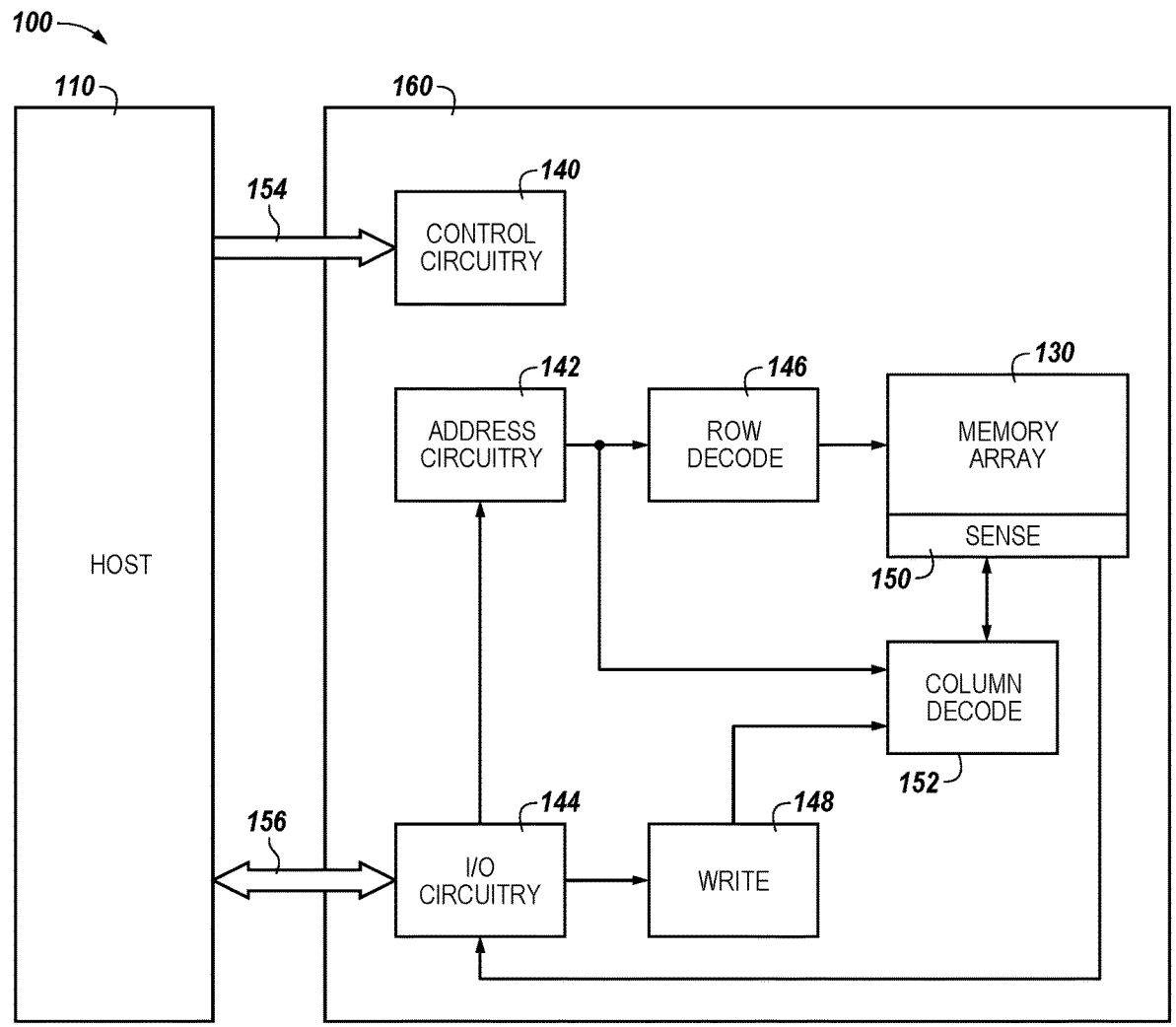
FIG. 1 is a block diagram of an apparatus in the form of a computing system including a memory device in accordance with a number of embodiments of the present disclosure.

The present disclosure includes apparatuses and methods related to division operations for memory. An example of logical values storable in a bit-vector (e.g., in a memory array) comprises a first address space comprising memory cells coupled to a sense line and to a first number of select lines. The memory cells of the first address space can store a dividend value. A second address space comprises memory cells coupled to the sense line and to a second number of select lines. The memory cells of the second address space can store a divisor value. The results of the division operation are stored in a third address space comprising memory cells coupled to the sense line and to a third number of select lines. The memory cells of the third address space can store a quotient value. A fourth address space comprises memory cells coupled to the sense line and to a fourth number of select lines. The memory cells of the fourth address space can store a remainder value.

As used herein, a dividend value is a numerical value that will be divided in a division operation. A divisor value is a value that divides the dividend value in a division operation. The results of a division operation can be a quotient value and a remainder value. A quotient value can express the whole number of times that a divisor value can divide the dividend value. A remainder value can express the remainder from the whole number of times that the divisor value can divide the dividend value. For example, if the dividend value is eleven and the divisor value is five, then the results of dividing the dividend value (e.g., eleven) by the divisor value (e.g., five) is a quotient value of two and a remainder value of one.

A number of embodiments of the present disclosure can provide a reduction of the number of computations and a time involved in performing a number of division operations (e.g., division functions) over previous approaches. The computations and the time can be reduced because the number of division operations can be performed in parallel (e.g., simultaneously). Performing the number of division operations in parallel can reduce the computations involved in performing the number of division operations. Performing a number of division operations in parallel can also reduce power consumption in performing a number of computations. For instance, a number of embodiments can provide for performing a division function using data (e.g., a dividend value and a divisor value) stored logically (e.g., in binary form in a number of memory cells in a memory array). The embodiment can perform a division function without transferring data out of the memory array and/or sensing circuitry via a bus (e.g., data bus, address bus, control bus, etc.). A division function can involve performing a number of logical operations (e.g., AND, NOT, NOR, NAND, XOR, etc.). However, embodiments are not limited to these examples.

In previous approaches, data, (e.g., a dividend value and a divisor value) may be transferred from the array and sensing circuitry (e.g., via a bus comprising input/output (I/O) lines) to a number of registers that can be used by a processing resource such as a processor, microprocessor, and/or compute engine, which may comprise ALU circuitry and/or other functional unit circuitry configured to perform the appropriate logical operations. However, only a single dividend value and a single divisor value can be used by ALU circuitry to perform a single division function (e.g., division operation). Transferring data to/from memory from/to registers via a bus can involve significant power consumption and time requirements. Even if the processing resource is located on a same chip as the memory array, significant power can be consumed in moving data out of the array to the compute circuitry, which can involve performing a sense line address access (e.g., firing of a column decode signal) in order to transfer data from sense lines onto I/O lines, moving the data to the array periphery, and providing the data to a register in association with a division function, for instance.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included. As used herein, "a number of" a particular thing can refer to one or more of such things (e.g., a number of memory arrays can refer to one or more memory arrays).

The figures herein follow a numbering convention in which the first digit or digits correspond to the drawing figure number and the remaining digits identify an element or component in the drawing. Similar elements or components between different figures may be identified by the use of similar digits. For example, 204 may reference element "04" in FIG. 2A, and a similar element may be referenced as 304 in FIG. 3A. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense FIG. 1 is a block diagram of an apparatus in the form of a computing system 100 including a memory device 160 in accordance with a number of embodiments of the present disclosure. As used herein, a memory device 160, a memory array 130, and/or sensing circuitry 150 might also be separately considered an "apparatus."

System 100 includes a host 110 coupled to memory device 160, which includes a memory array 130. Host 110 can be a host system such as a personal laptop computer, a desktop computer, a digital camera, a mobile telephone, or a memory card reader, among various other types of hosts. Host 110 can include a system motherboard and/or backplane and can include a number of processing resources (e.g., one or more processors, microprocessors, or some other type of controlling circuitry). The system 100 can include separate integrated circuits or both the host 110 and the memory device 160 can be on the same integrated circuit. The system 100 can be, for instance, a server system and/or a high performance computing (HPC) system and/or a portion thereof Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by select lines (which may be referred to herein as word lines or access lines) and columns coupled by sense lines (which may be referred to herein as digit lines or data lines). Although a single array 130 is shown in FIG. 1, embodiments are not so limited. For instance, memory device 160 may include a number of arrays 130 (e.g., a number of banks of DRAM cells). An example DRAM array is described in association with FIG. 2A.

The memory device 160 includes address circuitry 142 to latch address signals provided over an I/O bus 156 (e.g., a data bus) through I/O circuitry 144. Address signals are received and decoded by a row decoder 146 and a column decoder 152 to access the memory array 130. In a number of examples, address signals can be decoded by more or fewer row decoders. For example, memory device can include three row decoders. As used herein, a row decoder may be referred to as a select decoder. Data can be read from memory array 130 by sensing voltage and/or current changes on the sense lines using sensing circuitry 150. The sensing circuitry 150 can read and latch a page (e.g., row) of data from the memory array 130. The I/O circuitry 144 can be used for bi-directional data communication with host 110 over the I/O bus 156. The write circuitry 148 is used to write data to the memory array 130.

In a number of examples, the term decoding can include a pre-decoding, final-decoding, and/or any other type of decoding that is carried out in row decoder 146 and/or column decoder 152. In a number of examples the term pre-decoding includes circuitry implementing pre-decoding process such that addresses are not discretely addressed. The term pre-decoding and decoding can be used herein to differentiate between the terms discretely addressable lines, and/or individually addressable lines.

In a number of examples, a number of select lines and/or sense lines in memory array 130 can be individually addressed and/or decoded independently from the other select lines and/or sense lines of memory array 130. As used herein, a discrete address can be an address that does not require decoding in order to activate a particular select line. For example, address circuitry 142 can receive an address associated with a number of select lines that can be activated without decoding an address associated with the number of select lines. In a number of examples, individually addressed rows and/or discretely addresses rows can be referred to as fully decoded rows. The memory cells associated with memory array 130 can comprise memory cells otherwise used in DRAM arrays, SRAM arrays, STT RAM arrays, PCRAM arrays, TRAM arrays, RRAM arrays, NAND flash arrays, and/or NOR flash arrays, among other memory configurations, for instance.

Control circuitry 140 decodes signals provided by control bus 154 from the host 110. These signals can include chip enable signals, write enable signals, and address latch signals that are used to control operations performed on the memory array 130, including data read, data write, and data erase operations. In various embodiments, the control circuitry 140 is responsible for executing instructions from the host 110. The control circuitry 140 can be a state machine, a sequencer, or some other type of controller.

An example of the sensing circuitry 150 is described further below in association with FIG. 2A and FIGS. 3A-3K. For instance, in a number of embodiments, the sensing circuitry 150 can comprise a number of sense amplifiers and a number of compute components, which may comprise an accumulator and can be used to perform logical operations (e.g., on data associated with complementary sense lines). In a number of embodiments, the sensing circuitry (e.g., 150) can be used to perform division operation using data stored in array 130 as inputs and store the results of the division operation back to the array 130 without transferring via a sense line address access (e.g., without firing a column decode signal). Memory cells coupled to select lines and sense lines in memory array 130 can serve as temporary storage (e.g., registers) during the performance of the division operation and/or computations involved in performing the division operation. As such, a division function can be performed using sensing circuitry 150 rather than and/or in addition to being performed by processing resources external to the sensing circuitry (e.g., by a processor associated with host 110 and/or other processing circuitry, such as ALU circuitry, located on device 160 (e.g., on control circuitry 140 or elsewhere)).

In various previous approaches, data associated with a division operation, for instance, would be read from memory via sensing circuitry and provided to an external ALU. The external ALU circuitry would perform the division functions using the operands and the result could be transferred back to the array via the local I/O lines. In contrast, in a number of embodiments of the present disclosure, sensing circuitry (e.g., 150) is configured to perform a division operation on data stored in memory cells in memory array 130 and store the result back to the array 130 without enabling a local I/O line coupled to the sensing circuitry.

As such, in a number of embodiments, registers and or an ALU external to array 130 and sensing circuitry 150 may not be needed to perform the division function as the sensing circuitry 150 can perform the appropriate computations involved in performing the division function using the address space of memory array 130. Additionally, the division function can be performed without the use of an external processing resource.

Figure 2A:
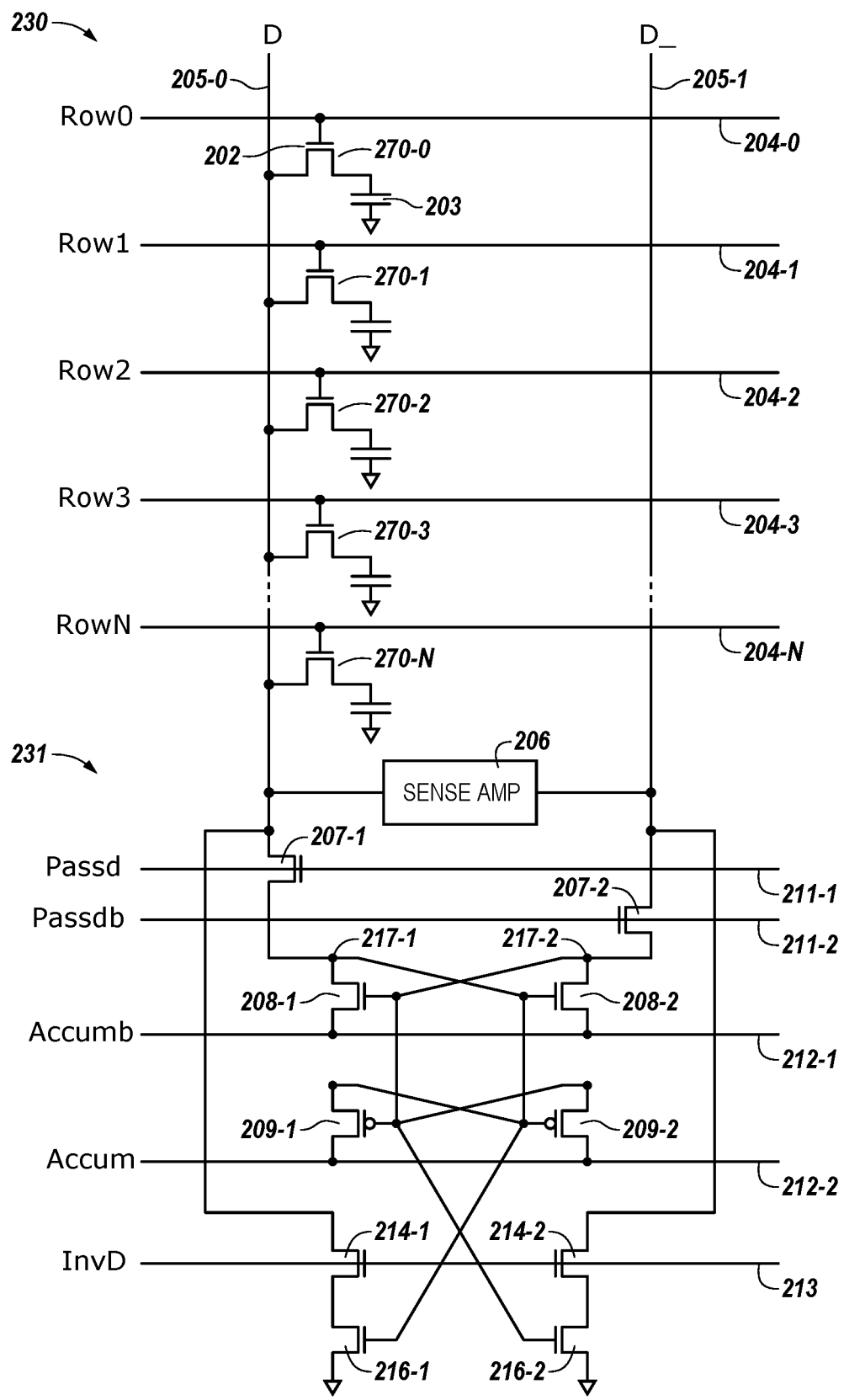
FIG. 2A illustrates a schematic diagram of a portion of a memory array in accordance with a number of embodiments of the present disclosure.

FIG. 2A illustrates a schematic diagram of a portion of a memory array 230 in accordance with a number of embodiments of the present disclosure. In this example, the memory array 230 is a DRAM array of 1T1C (one transistor one capacitor) memory cells 270-0, 270-1, 270-2, . . . , 270-N-1, 270-N (e.g., referred to collectively as memory cells 270) each comprised of an access device 202 (e.g., transistor) and a storage element 203 (e.g., a capacitor).

In a number of embodiments, the memory cells 270 are destructive read memory cells (e.g., reading the data stored in the cell destroys the data such that the data originally stored in the cell is refreshed after being read). The memory cells 270 are arranged in rows coupled by select lines 204-0 (Row0), 204-1 (Row1), 204-2 (Row2), . . . , 204-N-1 (RowN-1), 204-N (RowN) and columns coupled by sense lines (e.g., digit lines) 205-0 (D) and 205-1 (D_). In a number of embodiments, the array 230 can include address spaces that are coupled to separate circuitry.

In this example, each column of cells is associated with a pair of complementary sense lines 205-0 (D) and 205-1 (D_). Although only a single column of memory cells 270 is illustrated in FIG. 2A, embodiments are not so limited. For instance, a particular array may have a number of columns of cells and/or sense lines (e.g., 4,096, 8,192, 16,384, etc.). In FIG. 2A, memory cells 270 are coupled to sense line 205-0. A gate of a particular cell transistor 202 is coupled to its corresponding select line 204-0 to 204-N (e.g., referred to collectively as select lines 204), a first source/drain region is coupled to its corresponding sense line 205-0, and a second source/drain region of a particular cell transistor is coupled to its corresponding capacitor 203. Although not illustrated in FIG. 2A, the sense line 205-1 may also have memory cells coupled thereto.

In a number of examples, memory cells 270 that are coupled to sense line 205 can store bits. The bits can represent a logical representation of a value and/or a number of values (e.g., dividend value, divisor value, quotient value, and/or remainder value). For example, a dividend value can be represented by a four bit-vector that can be stored in memory cell 270-0, memory cell 270-1, memory cell 270-2, and memory cell 270-3. In a number of examples, a bit-vector can be represented by more or fewer bits than those used in FIG. 2A and FIGS. 3A-3K. For example, a dividend value can be represented by an 8 bit-vector, a 16 bit-vector, and/or a 32 bit-vector, among other bit-vector dimensions. In a number of examples, each bit-vector representation of a value can be stored vertically along the sense lines 205 as opposed to horizontally along the select lines 204.

Each bit-vector logical representation of a value can be indexed. For example, a bit stored in memory cell 270-0 can be associated with a first index, a bit stored in memory cell 270-1 can be associated with a second index, a bit stored in memory cell 270-2 can be associated with a third index, and a bit stored in memory cell 270-3 can be associated with a fourth index. As an example, the first index can indicate a most significant bit (MSB) of a stored bit-vector and the fourth index can indicate a least significant bit (LSB) of the stored bit-vector. The indexing used in association with FIG. 2A is demonstrative and not limiting. Other indexing systems and/or orders can be employed in a number of embodiments. For examples, a bit stored in memory 270-3 can be associated with a first index, a bit stored in memory cell 270-2 can be associated with a second index, a bit stored in memory cell 270-1 can be associated with a third index, and a bit stored in memory cell 270-0 can be associated with a fourth index. Furthermore, the operations described herein can be performed using a number of different layouts and/or memory cell orientations.

A number of values can be stored in each of the sense lines of memory array 230. For example, memory cells 270-0, 270-1, 270-2, 270-3 can store a number of bits that represent a first dividend value, memory cells 270-4, 270-5, 270-6, 270-7 can store a number of bits that represent a first divisor value, memory cells 270-8, 270-9, 270-10, 270-11 can store a number of bits that represent a first quotient value, and memory cells 270-12, 270-13, 270-14, 270-15 can store a number of bits that represent a first remainder value (e.g., memory cells 270-3 to memory cells 270-15 are not illustrated in FIG. 2A). Memory cells 270-0 to 270-15 can be coupled to a first sense line. Memory cells coupled to a different sense line can store a number of bits that represent a second dividend value, a second divisor value, a second quotient value, and/or a second remainder value.

In a number of examples, the memory cells coupled to a select line 204-0 and to a number of sense lines (e.g., sense line 205-0 and sense line 205-1) can be activated in parallel. Furthermore, memory cell 270-0, memory cell 270-1, memory cell 270-2, memory cell 270-3 can also be activated in parallel. In a number of examples, independently addressed select lines 204 and/or sense lines 205 can be activated in parallel to activate a number of memory cells in parallel.

The sensing circuitry comprises a sense amplifier 206 and a compute component 231. The sensing circuitry can be sensing circuitry 150 shown in FIG. 1. The sense amplifier 206 is coupled to the complementary sense lines D, D_ corresponding to a particular column of memory cells. The sense amplifier 206 can be operated to determine a state (e.g., logic data value) stored in a selected cell (e.g., memory cells 270). Embodiments are not limited to the example sense amplifier 206. For instance, sensing circuitry in accordance with a number of embodiments described herein can include current-mode sense amplifiers and/or single-ended sense amplifiers (e.g., sense amplifiers coupled to one sense line).

In a number of embodiments, a compute component (e.g., 231) can comprise a number of transistors formed on pitch with the transistors of the sense amplifier (e.g., 206) and/or the memory cells 270 of the array (e.g., 230), which may conform to a particular feature size (e.g., $4F^2$, $6F^2$, etc.). As described further below, the compute component 231 can, in conjunction with the sense amplifier 206, operate to perform a division operation using data from the memory cells 270 in the array 230 as input and store the result back to the memory cells 270 in the array 230 without transferring the data via a sense line address access (e.g., without firing a column decode signal such that data is transferred to circuitry external from the array and sensing circuitry via local I/O lines). As such, a number of embodiments of the present disclosure can enable performing a division operation and computations associated therewith using less power than various previous approaches. Additionally, since a number of embodiments eliminate the need to transfer data across local I/O lines in order to perform compute functions, a number of embodiments can enable an increased parallel processing capability using compute components (e.g., 231) and the memory cells 270 as compared to previous approaches.

In the example illustrated in FIG. 2A, the circuitry corresponding to compute component 231 comprises five transistors coupled to each of the sense lines D and D_; however, embodiments are not limited to this example. Transistors 207-1 and 207-2 have a first source/drain region coupled to sense lines D and D_, respectively, and a second source/drain region coupled to a cross coupled latch (e.g., coupled to gates of a pair of cross coupled transistors, such as cross coupled NMOS transistors 208-1 and 208-2 and cross coupled PMOS transistors 209-1 and 209-2. As described further herein, the cross coupled latch comprising transistors 208-1, 208-2, 209-1, and 209-2 can be referred to as a secondary latch (the cross coupled latch corresponding to sense amplifier 206 can be referred to herein as a primary latch).

The transistors 207-1 and 207-2 can be referred to as pass transistors, which can be enabled via respective signals 211-1 (Passd) and 211-2 (Passdb) in order to pass the voltages or currents on the respective sense lines D and D_ to the inputs of the cross coupled latch comprising transistors 208-1, 208-2, 209-1, and 209-2 (e.g., the input of the secondary latch). In this example, the second source/drain region of transistor 207-1 is coupled to a first source/drain region of transistors 208-1 and 209-1 as well as to the gates of transistors 208-2 and 209-2. Similarly, the second source/drain region of transistor 207-2 is coupled to a first source/drain region of transistors 208-2 and 209-2 as well as to the gates of transistors 208-1 and 209-1.

A second source/drain region of transistor 208-1 and 208-2 is commonly coupled to a negative control signal 212-1 (Accumb). A second source/drain region of transistors 209-1 and 209-2 is commonly coupled to a positive control signal 212-2 (Accum). The Accum signal 212-2 can be a supply voltage (e.g., Vcc) and the Accumb signal can be a reference voltage (e.g., ground). Enabling signals 212-1 and 212-2 activates the cross coupled latch comprising transistors 208-1, 208-2, 209-1, and 209-2 corresponding to the secondary latch. The activated sense amplifier pair operates to amplify a differential voltage between common node 217-1 and common node 217-2 such that node 217-1 is driven to one of the Accum signal voltage and the Accumb signal voltage (e.g., to one of Vcc and ground), and node 217-2 is driven to the other of the Accum signal voltage and the Accumb signal voltage. As described further below, the signals 212-1 and 212-2 are labeled "Accum" and "Accumb" because the secondary latch can serve as an accumulator while being used to perform a logical operation (e.g., a division operation). In a number of embodiments, an accumulator comprises the cross coupled transistors 208-1, 208-2, 209-1, and 209-2 forming the secondary latch as well as the pass transistors 207-1 and 208-2. As described further herein, in a number of embodiments, a compute component comprising an accumulator coupled to a sense amplifier can be configured to perform a logical operation that comprises performing an accumulate operation on a data value represented by a signal (e.g., voltage or current) on at least one of a pair of complementary sense lines.

The compute component 231 also includes inverting transistors 214-1 and 214-2 having a first source/drain region coupled to the respective digit lines D and D_. A second source/drain region of the transistors 214-1 and 214-2 is coupled to a first source/drain region of transistors 216-1 and 216-2, respectively. The gates of transistors 214-1 and 214-2 are coupled to a signal 213 (InvD). The gate of transistor 216-1 is coupled to the common node 217-1 to which the gate of transistor 208-2, the gate of transistor 209-2, and the first source/drain region of transistor 208-1 are also coupled. In a complementary fashion, the gate of transistor 216-2 is coupled to the common node 217-2 to which the gate of transistor 208-1, the gate of transistor 209-1, and the first source/drain region of transistor 208-2 are also coupled. As such, enabling signal InvD serves to invert the data value stored in the secondary latch and drives the inverted value onto sense lines 205-0 and 205-1.

In FIG. 2A, the compute component 231 is configured to perform a division operation. The following example will demonstrate how a division operation can be performed using data stored in array 230 as the inputs, and how the result of the division operation can be stored in the array via operation of the sensing circuitry (e.g., sense amplifier 206 and compute component 231). The example involves using the bits (e.g., logic 1 or logic 0) stored in the memory cells 270 coupled to select lines 204-0 to 204-N and commonly coupled to sense line 205-0 as the respective inputs to the division operation. The result of the division operation can be stored in memory cells coupled to sense line 205-0.

As an example, the compute component 231 can use a dividend value and a divisor value stored in a first portion and a second portion of a number of memory cells 270 that are coupled to sense line 205-0. The first portion can include a first number of memory cells. The second portion can include a second number of memory cells. The intermediate result of the division operation can be saved in a third portion and/or a fourth portion of memory cell that are coupled to sense line 205-0.

A division operation can include copying the bits stored in memory cells 270-0 to 270-3 that store the dividend value into memory cell 270-12 of memory cells 270-12 to 270-15 that store the remainder value. The bits stored in memory cells 270-0 to 270-3 can be copied consecutively (e.g., one-by-one) to memory cell 270-12. The bits stored in memory cells 270-0 to 270-3 can be copied in reverse order as compared to the order in which they are stored in memory cells 270-0 to 270-3. For example, a bit stored in memory cell 270-3 can be copied to memory cell 270-12 before a bit stored in memory cell 270-2 is copied to memory cell 270-12.

In a number of examples, the bits stored in memory cells 270-0 to 270-3 can be copied to a memory cell associated with a first index of the remainder bit vector. Memory cell 270-12 is associated with a first index of the remainder bit-vector because memory cell 270-12 can store a first bit of the remainder bit-vector. For example, a remainder value that is equal to five can be represented by a bit-vector [0101]. The bit-vector can be stored in memory cells 270-12 to 270-15. The first bit of bit-vector [010<u>1</u>] can be equal to 1 and can be stored in a memory cell 270-12 associated with a first index. The second bit of bit-vector [01<u>0</u>1] can be equal to 0 and can be stored in a memory cell 270-13 associated with a second index. The memory cell 270-14 associated with a third index can be equal to 1. The memory cell 270-15 associated with a fourth index can be equal to 0.

The division operation can be divided into iterations of computations. As used herein, computations can describe computation operations involved in performing the division operation. For example, a copy operation can be a computation and/or an addition operation can be a computation, among other computations. An iteration of the division operation can begin each time one of the bits of the dividend value is copied to a memory cell associated with a first index of the remainder bit-vector.

A mask can be created each time a bit is copied to a memory cell associated with a first index of the remainder bit-vector. A mask can indicate whether a divisor value is less than or equal to a corresponding remainder value. If the divisor value is less than or equal to the remainder value, then the corresponding bit of the mask can be set to a value equal to one and the divisor value can be subtracted from the remainder value and a logical representation (e.g., bit-vector) of the result of the subtraction can be stored and shifted, if the bit copied to the memory cell associated with the first index of the remainder bit vector is not the last bit of the dividend value to be iterated, to update the remainder value, and a logical representation (e.g., bit vector) of the quotient value can be incremented by one. If the divisor value is greater than the remainder value, then the corresponding bit of the mask is set to zero and a logical representation of the quotient value and the logical representation of the remainder value can be shifted to update the quotient value and the remainder value, respectively. Shifting will be further explained in relation to FIGS. 3A to 3K. The above division operation is given as an example in FIGS. 3A to 3K.

Embodiments of the present disclosure are not limited to the particular sensing circuitry configuration illustrated in FIG. 2A. For instance, different compute component circuitry can be used to perform logical operations in accordance with a number of embodiments described herein. Although not illustrated in FIG. 2A, in a number of embodiments, control circuitry can be coupled to array 230, sense amplifier 206, and/or compute component 231. Such control circuitry may be implemented on a same chip as the array and sensing circuitry and/or on an external processing resource such as an external processor, for instance, and can control enabling/disabling various signals corresponding to the array and sensing circuitry in order to perform logical operations as described herein. Furthermore, although a single pair of complementary sense lines (205-0/205-1) are shown in FIG. 2A, array 230 can include multiple complementary sense line pairs.

Example pseudo code providing a summary for performing division operations in a memory is given as follows:

```
for bitN in dividend{
    copy bitN into bit0 of remainder
    compare divisor with remainder
    if (divisor <= remainder){
        subtract divisor from remainder, store in remainder
        leftshift quotient and add 1
        if (bitN is not the last bit){
            leftshift remainder
        }
    } else {
        leftshift quotient
        leftshift remainder
    }
}
```

In a number of embodiments, a division operation can be performed using a subtraction operation, an addition operation, a compare operation, a shift operation, and/or a copy operation among other operations that can be used to perform the division operation. The subtraction operation, the addition operation, the compare operation, the shift operation, and/or the copy operation can be performed using boolean operations and non-boolean operations. In a number of embodiments, boolean and non-boolean operations can be performed using logical operations (e.g., NAND, AND, NOR, OR, etc.). An example of performing NAND, AND, NOR, and OR logical operations in conjunction with the compute component 231 is given in FIGS. 2B, 2C-1, 2C-1, 2D-1, and 2D-2.

Table 1 gives an example a number of instructions that can be executed to perform an addition operation. The example given in Table 1 adds 1 (one) to the logical representation (e.g., bit-vector) of the value (e.g., the addend) stored in a portion of a memory array 230. A bit-vector "srcdest[p]" is a logical representation of the addend and can be stored in a first number of memory cells in the memory array 230. The bit-vector srcdest[p] is a logical representation of a numerical value to which 1 will be added. P represents an index that is associated with bit-vector srcdest[p]. For example, the bit-vector [011] is a logical representation of the value 3 that can be stored in the memory cells 270-0 to 270-2 such that the bit srcdest[0] is equal to 1, the bit srcdest[1] is equal to 1, and the bit srcdest[2] is equal to 0. A bit-vector tmp[p] is a logical representation of a storage variable and can be stored in a second number of memory cells in the memory array 230. For example, the bit-vector tmp[p] can be stored in the memory cells 270-3 to 270-5.

TABLE 1

Add one:

read srcdest[0]
write tmp[0]
write-inverted srcdest[0]

TABLE 1-continued

For all remaining P bits:

read srcdest[p]
or tmp[0]
write tmp[1]
read srcdest[p]
nand tmp[0]
write-inverted tmp[0]
and tmp[1]
write srcdest[p]

The addition operation can be divided into two stages. The "Add one" stage can add a 1 to the logical representation of the first bit-vector srcdest[p]. A "read srcdest[0]" call, in the "Add one" stage, can read (e.g. latch) a bit with a first index in the bit-vector srcdest[p]. For example, a bit stored in the memory cell 270-0 can be latched, as described herein, in the sense amp 206 and and/or the compute component 231. A "write tmp[0]" call can store the value that is latched in the sense amp 206 and/or the compute component 231 in the memory cell 270-3 (e.g., first index of the bit-vector tmp[0]) by activating the memory cell 270-3. A "write-inverted srcdest[0]" call can invert the bit that is stored at the sense amp 206 and/or the compute component 231 and can store the inverted bit to the memory cell 270-0 by activating memory cell 270-0.

The "For all remaining P bits" stage can carry any remainder from the first stage to the other bits in the bit-vector srcdest[p] by performing the calls in Table 1 for every index after the first index in the bit-vector srcdest[p]. For example, a "read srcdest[p]" call, on a first iteration, can read the bit stored in the memory cell 270-1 by latching the bit stored in the memory cell 270-1 at the sense amp 206 and/or the compute component 231. The "or tmp[0]" call can perform an OR operation using the latched bit (e.g., bit read from memory cell 270-1) and a bit stored in the memory cell 270-3 as inputs. The bit stored in the memory cell 270-3 can be latched after the "read srcdest[p]" call. The OR operation can be performed in the compute component 231 as described below. A "write tmp[1]" call can store the result of the OR operation in a memory cell 270-4 by activating the memory cell 270-4. A "read srcdest[p]" call can latch the bit stored in the memory array 270-1 at the sense amp 206. A "nand tmp[0]" call can perform a NAND operation using the latched bit (e.g., bit stored in the sense amp 206 and/or the compute component 231) and a bit stored in the memory cell 270-3 as inputs. The bit stored in the memory cell 270-3 can be latched at the sense amp 260 and provided to the compute component 231 as an input for the NAND operation after the "read srcdest[p]" call. A "write-inverted tmp[0]" call can invert the result of the NAND operation at the compute component 231. The inverted bit can be stored in the memory cell 270-3 by activating the memory cell 270-3. The "and tmp[1]" call can perform an AND operation using the result of the NAND operation and the bit stored in the memory cell 270-4 as input. The "write srcdest[p]" call can store the result of the AND operation in the memory cell 270-1. At this point, a second iteration of the second stage can be performed using a third index for p. The addition operation can conclude when the addition operation reaches a last index of the bit-vector srcdest[p].

Table 2 gives an example of a number of instructions that can be executed to perform a subtraction operation. The subtraction operation shown in Table 2 can be performed using the syntax used in Table 1. The subtraction operation can include three stages. A "Setup" stage, a "Loop-through remaining P bits" stage, and a "Cleanup" stage. The instructions given in Table 2 use a bit-vector minuend[p], a bit-vector subtrahend[p], a bit-vector tmp[p], and a bit-vector result[p]. The bit-vector subtrahend[p] is a logical representation of a subtrahend value while the bit-vector minuend[p] is a logical representation of a minuend value. In the subtraction operation the subtrahend value is subtracted from the minuend value. The bit-vector result[p] is a logical representation of a result value of the subtraction operation can be stored in the bit-vector result[p]. The bit-vector tmp[p] is a logical representation of a value that is used as temporary storage while executing the subtraction operation. The bit-vectors minuend[p], subtrahend[p], tmp [p], and result[p] can be stored in a number of memory cells 270 in the memory array 230. For example, the bit-vector minuend[p] can be stored in memory cells 270-0 to 270-3, the bit-vector subtrahend[p] can be stored in memory cells 270-4 to 270-7, the bit-vector tmp[p] can be stored in memory cells 270-8 to 270-11, and the bit-vector result[p] can be stored in memory cells 270-12 to 270-15. The subtraction operation can include calculating the twos-complement of the subtrahend value and adding the twos complement of the subtrahend value to minuend value. The twos-complement of the subtrahend value can be calculated bit-by-bit as it is added to the corresponding bits of the minuend value.

TABLE 2

Setup:

read minuend[0]
nand subtrahend[0]
write tmp[0]
read minuend[0]
or subtrahend[0]
and tmp[0]
write result[0]
and minuend[0]
write-inverted tmp[0]
Loop-through remaining P bits:

read subtrahend[p]
write-inverted subtrahend[p]
xor minuend[p]
xor tmp[0]
write result[p]
read minuend[p]
xor subtrahend[p]
and tmp[0]
write tmp[1]
read minuend[p]
and subtrahend[p]
or tmp[1]
write tmp[0]
read subtrahend[p]
write-inverted subtrahend[p]
Cleanup:

read subtrahend[p]
write-inverted subtrahend[p]
xor minuend [p]
xor tmp[0]
write result [p]
read subtrahend [p]
write-inverted subtrahend[p]

Table 3 gives an example a number of instructions that can be executed to perform a copy and/or shift operation. A copy operation can use an input value as an input and an output value as an output. A bit-vector input[p] is a logical representation of the input value. A bit-vector output[p] is a logical representation of the output value. For every index in the bit-vector input[p] a bit is read from a memory cell that corresponds to the bit-vector input[p] by latching the corresponding bit at the sense amp 206 and/or the compute component 231. The latched corresponding bit can be stored in a memory cell that corresponds to the bit-vector output[p] with the same index as the bit-vector input[p]. A left shift operation can include adding a shift value to the index of the bit-vector output[p] before a bit is stored to a memory cell that corresponds to the bit-vector output[p]. For example, a "read input[p]" call can latch a bit that is stored in a memory cell that has a first index from a first portion of the memory array 230 that corresponds to the bit-vector input[p] and a "write output[p]" call can store the bit in a memory cell that has a second index from a second portion of the memory array 230 that corresponds to the bit-vector output[p].

TABLE 3

For each of the P bits read input[p]
write output[p]

Table 4 gives an example a number of instructions that can be executed to perform the compare operation. The compare operation can compare a divisor value with a remainder value to determine if the divisor value is greater than the remainder value. A bit-vector divisor[p] is a logical representation of the divisor value. A bit-vector remainder [p] is a logical representation of the remainder value. Max as used in the "read divisor[max]" call represents a highest index that is associated with the bit-vector divisor[p] and/or the bit-vector remainder[p]. A bit difference_found_yet[0] and a bit difference_this_time[0] are logical representations of variables that are used as temporary storage. A bit result[0] is a logical representation of a result variable. The compare operation includes a "Setup" stage, a "Loop-through remaining P bits" stage, and a "Cleanup" stage. The "Setup" stage uses the largest index of the bit-vector divisor [p] and the bit-vector remainder[p]. The "Loop-through remaining P bits" stage begins at an index that is one smaller than the largest index and loops by decrementing the index until reaching a first index of the bit-vector divisor[p] and the bit-vector remainder[p]. For example, if a largest index is 4, then the "Loop-through remaining P bits" stage begins with an index equal to 3 and decrements the index until reaching a first index equal to 1. The "Cleanup" stage inverts the bit result[0] and stores the bit in a memory cell associated with the bit result[0].

TABLE 4

Setup:

read divisor[max]
xor remainder[max]
write difference_found_yet[0]
and divisor [max]
write result[0]
Loop-through remaining P bits:

read divisor [p]
xor remainder [p]
write difference_this_time[0]
xor difference_found_yet[0]
and difference_this_time[0]
write difference_this_time[0]
or difference_found_yet[0]
write difference_found_yet[0]
read difference_this_time[0]

TABLE 4-continued and divisor[p]
or result[0]
write result[0]
Cleanup write-inverted result[0]

Figure 2B:
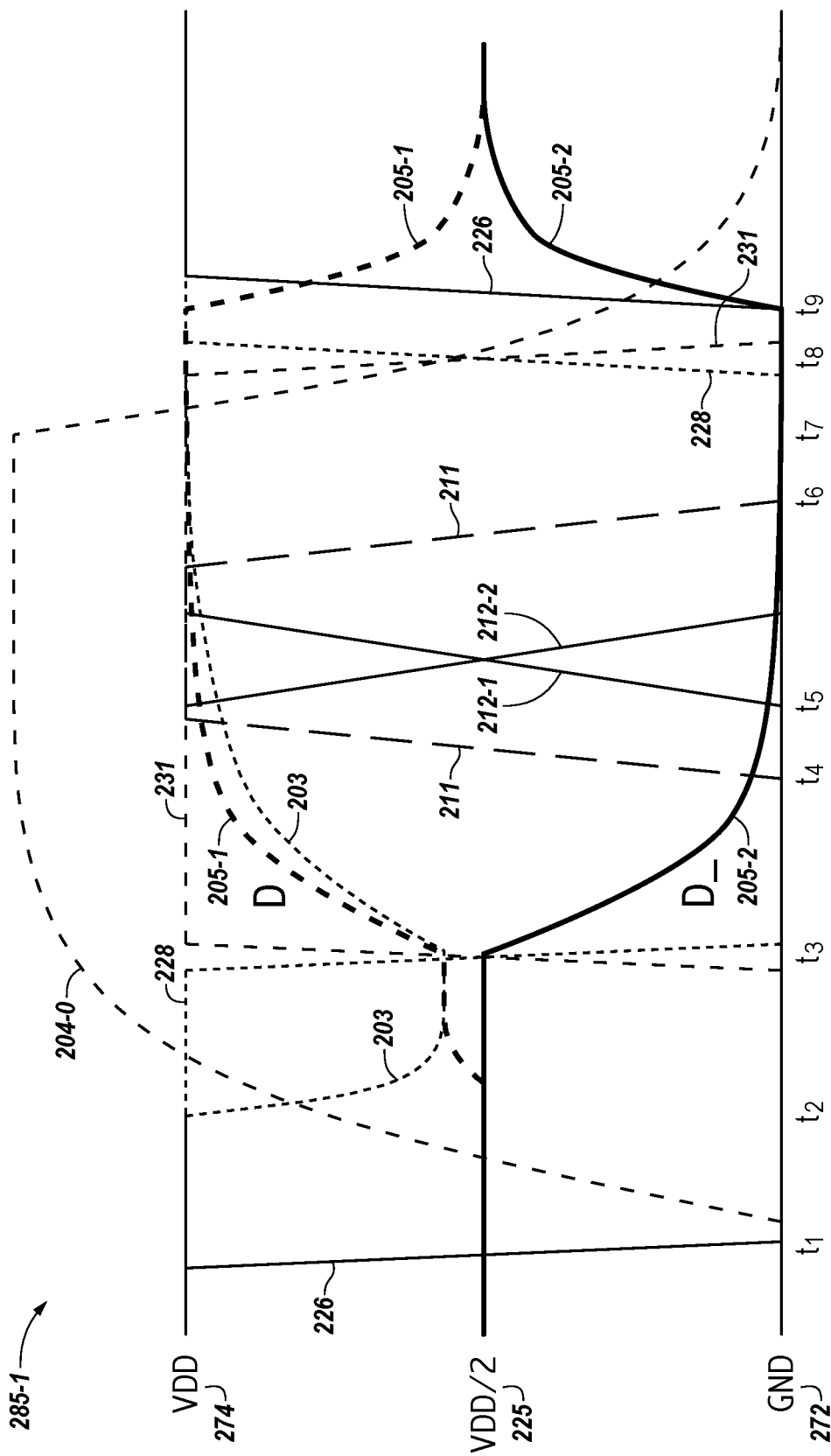
FIG. 2B illustrates a timing diagram associated with performing a number of logical operations using sensing circuitry in accordance with a number of embodiments of the present disclosure.

FIG. 2B illustrates a timing diagram 285-1 associated with performing a number of logical operations using sensing circuitry in accordance with a number of embodiments of the present disclosure. Timing diagram 285-1 illustrates signals (e.g., voltage signals) associated with performing a first operation phase of a logical operation (e.g., an R-input logical operation). The first operation phase described in FIG. 2B can be a first operation phase of an AND, NAND, OR, or NOR operation, for instance. As described further below, performing the operation phase illustrated in FIG. 2B can involve consuming significantly less energy (e.g., about half) than previous processing approaches, which may involve providing a full swing between voltage rails (e.g., between a supply and ground) to perform a compute function.

In the example illustrated in FIG. 2B, the voltage rails corresponding to complementary logic values (e.g., "1" and "0") are a supply voltage 274 (VDD) and a ground voltage 272 (Gnd). Prior to performing a logical operation, equilibration can occur such that the complementary sense lines D and D_ are shorted together at an equilibration voltage 225 (VDD/2). Equilibration is described further below in association with FIG. 3.

At time $t_1$, the equilibration signal 226 is deactivated, and then a selected row is activated (e.g., the row corresponding to a memory cell whose data value is to be sensed and used as a first input). Signal 204-0 represents the voltage signal applied to the selected row (e.g., row 204-0). When row signal 204-0 reaches the threshold voltage (Vt) of the access transistor (e.g., 202) corresponding to the selected cell, the access transistor turns on and couples the sense line D to the selected memory cell (e.g., to the capacitor 203 if the cell is a 1T1C DRAM cell), which creates a differential voltage signal between the sense lines D and D_ (e.g., as indicated by signals 205-0 and 205-1, respectively) between times $t_2$ and $t_3$. The voltage of the selected cell is represented by signal 203. Due to conservation of energy, creating the differential signal between D and D_ (e.g., by coupling the cell to sense line D) does not consume energy, since the energy associated with activating/deactivating the row signal 204 can be amortized over the plurality of memory cells coupled to the row.

At time $t_3$, the sense amp (e.g., 206) activates (e.g., the positive control signal 231 goes high, and the negative control signal 228 goes low), which amplifies the differential signal between D and D_, resulting in a voltage (e.g., VDD) corresponding to a logic 1 or a voltage (e.g., ground) corresponding to a logic 0 being on sense line D (and the other voltage being on complementary sense line D_), such that the sensed data value is stored in the primary latch of sense amp 206. The primary energy consumption occurs in charging the sense line D (205-0) from the equilibration voltage VDD/2 to the rail voltage VDD.

At time $t_4$, the pass transistors 207-1 and 207-2 are enabled (e.g., via respective Passd and Passdb control signals applied to control lines 211-1 and 211-2, respectively). The control signals 211-1 and 211-2 are referred to collectively as control signals 211. As used herein, various control signals, such as Passd and Passdb, may be referenced by referring to the control lines to which the signals are applied. For instance, a Passd signal can be referred to as control signal 211-1. At time $t_5$, the accumulator control signals Accumb and Accum are activated via respective control lines 212-1 and 212-2. As described below, the accumulator control signals 212-1 and 212-2 may remain activated for subsequent operation phases. As such, in this example, activating the control signals 212-1 and 212-2 activates the secondary latch (e.g., accumulator) of compute component 231. The sensed data value stored in sense amp 206 is transferred (e.g., copied) to the secondary latch.

At time $t_6$, the pass transistors 207-1 and 207-2 are disabled (e.g., turned off); however, since the accumulator control signals 212-1 and 212-2 remain activated, an accumulated result is stored (e.g., latched) in the secondary latch (e.g., accumulator). At time $t_7$, the row signal 204-0 is deactivated, and the array sense amps are deactivated at time $t_8$ (e.g., sense amp control signals 228 and 231 are deactivated).

At time $t_9$, the sense lines D and D_ are equilibrated (e.g., equilibration signal 226 is activated), as illustrated by sense line voltage signals 205-0 and 205-1 moving from their respective rail values to the equilibration voltage 225 (VDD/2). The equilibration consumes little energy due to the law of conservation of energy. Equilibration can involve shorting the complementary sense lines D and D_ together at an equilibration voltage, which is VDD/2, in this example. Equilibration can occur, for instance, prior to a memory cell sensing operation.

Figures 1, 2C:
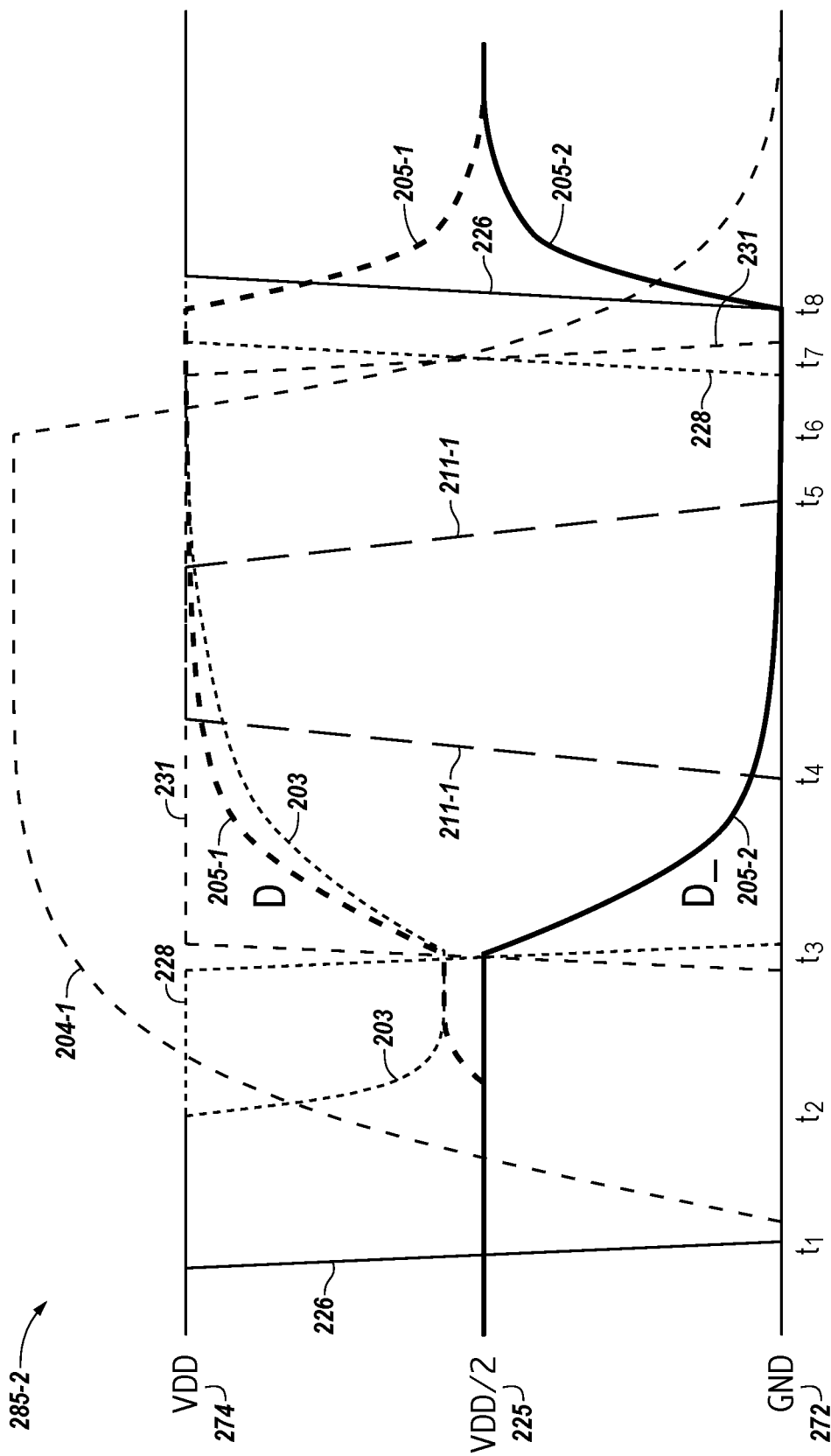
Figures 2, 2C:
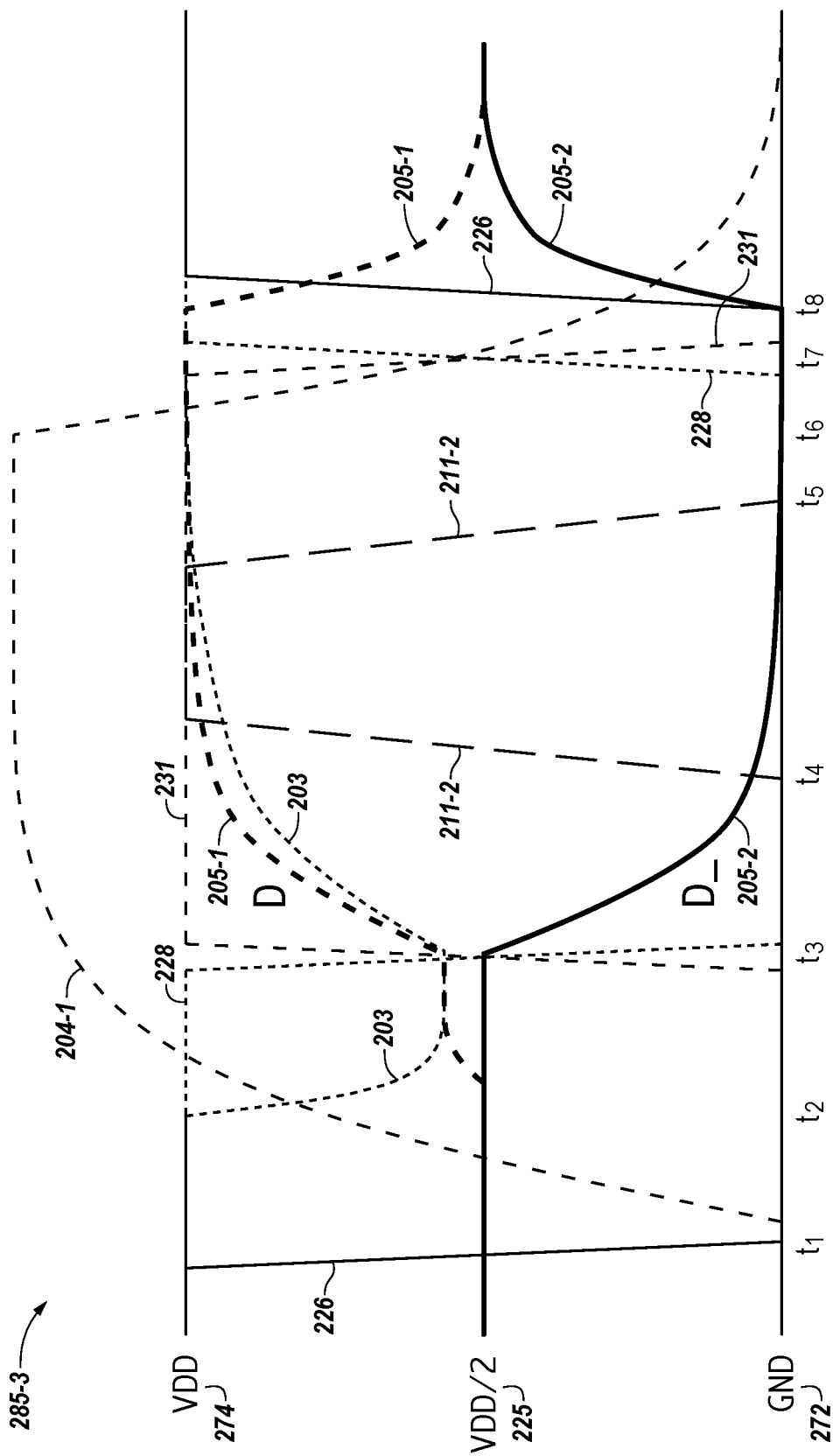

FIGS. 2C-1 and 2C-2 illustrate timing diagrams 285-2 and 285-3, respectively, associated with performing a number of logical operations using sensing circuitry in accordance with a number of embodiments of the present disclosure. Timing diagrams 285-2 and 285-3 illustrate signals (e.g., voltage signals) associated with performing a number of intermediate operation phases of a logical operation (e.g., an R-input logical operation). For instance, timing diagram 285-2 corresponds to a number of intermediate operation phases of an R-input NAND operation or an R-input AND operation, and timing diagram 285-3 corresponds to a number of intermediate operation phases of an R-input NOR operation or an R-input OR operation. For example, performing an AND or NAND operation can include performing the operation phase shown in FIG. 2C-1 one or more times subsequent to an initial operation phase such as that described in FIG. 2B. Similarly, performing an OR or NOR operation can include performing the operation phase shown in FIG. 2C-2 one or more times subsequent to an initial operation phase such as that described in FIG. 2B.

As shown in timing diagrams 285-2 and 285-3, at time equilibration is disabled (e.g., the equilibration signal 226 is deactivated), and then a selected row is activated (e.g., the row corresponding to a memory cell whose data value is to be sensed and used as an input such as a second input, third input, etc.). Signal 204-1 represents the voltage signal applied to the selected row (e.g., row 204-1). When row signal 204-1 reaches the threshold voltage (Vt) of the access transistor (e.g., 202) corresponding to the selected cell, the access transistor turns on and couples the sense line D to the selected memory cell (e.g., to the capacitor 203 if the cell is a 1T1C DRAM cell), which creates a differential voltage signal between the sense lines D and D_ (e.g., as indicated by signals 205-0 and 205-1, respectively) between times $t_2$ and $t_3$. The voltage of the selected cell is represented by signal 203. Due to conservation of energy, creating the differential signal between D and D_ (e.g., by coupling the cell to sense line D) does not consume energy, since the energy associated with activating/deactivating the row signal 204 can be amortized over the plurality of memory cells coupled to the row.

At time $t_3$, the sense amp (e.g., 206) activates (e.g., the positive control signal 231 goes high, and the negative control signal 228 goes low), which amplifies the differential signal between D and D_, resulting in a voltage (e.g., VDD) corresponding to a logic 1 or a voltage (e.g., ground) corresponding to a logic 0 being on sense line D (and the other voltage being on complementary sense line D_), such that the sensed data value is stored in the primary latch of sense amp 206. The primary energy consumption occurs in charging the sense line D (205-0) from the equilibration voltage VDD/2 to the rail voltage VDD.

As shown in timing diagrams 285-2 and 285-3, at time $t_4$ (e.g., after the selected cell is sensed), only one of control signals 211-1 (Passd) and 211-2 (Passdb) is activated (e.g., only one of pass transistors 207-1 and 207-2 is enabled), depending on the particular logic operation. For example, since timing diagram 285-2 corresponds to an intermediate phase of a NAND or AND operation, control signal 211-1 is activated at time t4 and control signal 211-2 remains deactivated. Conversely, since timing diagram 285-3 corresponds to an intermediate phase of a NOR or OR operation, control signal 211-2 is activated at time t4 and control signal 211-1 remains deactivated. Recall from above that the accumulator control signals 212-1 (Accumb) and 212-2 (Accum) were activated during the initial operation phase described in FIG. 2B, and they remain activated during the intermediate operation phase(s).

Since the accumulator was previously activated, activating only Passd (211-1) results in accumulating the data value corresponding to the voltage signal 205-0. Similarly, activating only Passdb (211-2) results in accumulating the data value corresponding to the voltage signal 205-1. For instance, in an example AND/NAND operation (e.g., timing diagram 285-2) in which only Passd (211-1) is activated, if the data value stored in the selected memory cell (e.g., a Row1 memory cell in this example) is a logic 0, then the accumulated value associated with the secondary latch is asserted low such that the secondary latch stores logic 0. If the data value stored in the Row1 memory cell is not a logic 0, then the secondary latch retains its stored Row0 data value (e.g., a logic 1 or a logic 0). As such, in this AND/NAND operation example, the secondary latch is serving as a zeroes (0s) accumulator. Similarly, in an example OR/NOR operation (e.g., timing diagram 285-3) in which only Passdb is activated, if the data value stored in the selected memory cell (e.g., a Row1 memory cell in this example) is a logic 1, then the accumulated value associated with the secondary latch is asserted high such that the secondary latch stores logic 1. If the data value stored in the Row1 memory cell is not a logic 1, then the secondary latch retains its stored Row0 data value (e.g., a logic 1 or a logic 0). As such, in this OR/NOR operation example, the secondary latch is effectively serving as a ones (1s) accumulator since voltage signal 205-1 on D_ is setting the true data value of the accumulator.

At the conclusion of an intermediate operation phase such as that shown in FIG. 2C-1 and 2C-2, the Passd signal (e.g., for AND/NAND) or the Passdb signal (e.g., for OR/NOR) is deactivated (e.g., at time t5), the selected row is deactivated (e.g., at time t6), the sense amp is deactivated (e.g., at time t7), and equilibration occurs (e.g., at time t8). An intermediate operation phase such as that illustrated in FIG. 2C-1 or 2C-2 can be repeated in order to accumulate results from a number of additional rows. As an example, the sequence of timing diagram 285-2 or 285-3 can be performed a subsequent (e.g., second) time for a Row2 memory cell, a subsequent (e.g., third) time for a Row3 memory cell, etc. For instance, for a 10-input NOR operation, the intermediate phase shown in FIG. 2C-2 can occur 9 times to provide 9 inputs of the 10-input logical operation, with the tenth input being determined during the initial operation phase (e.g., as described in FIG. 2B).

Figures 1, 2D:
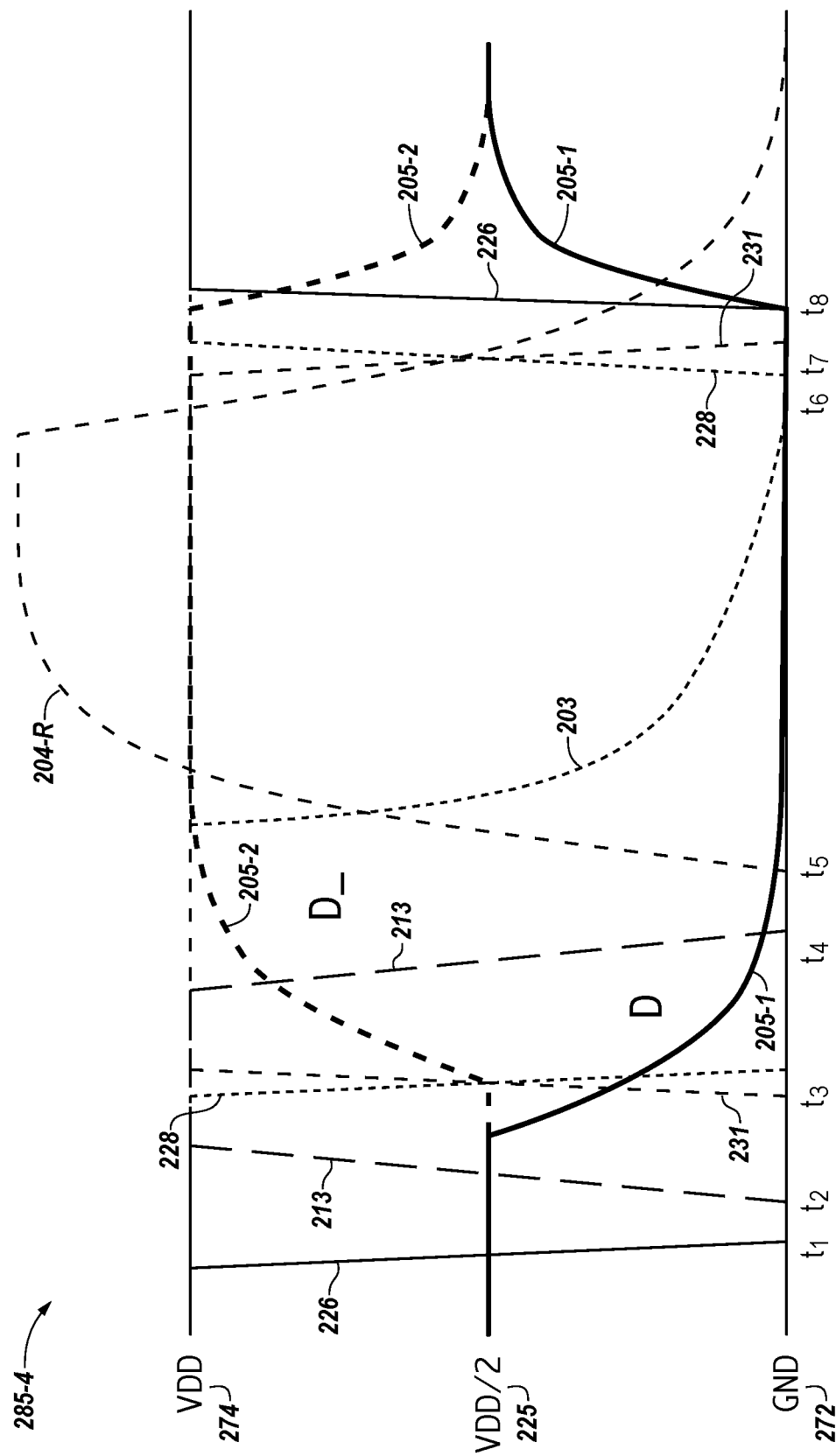
Figures 2, 2D:
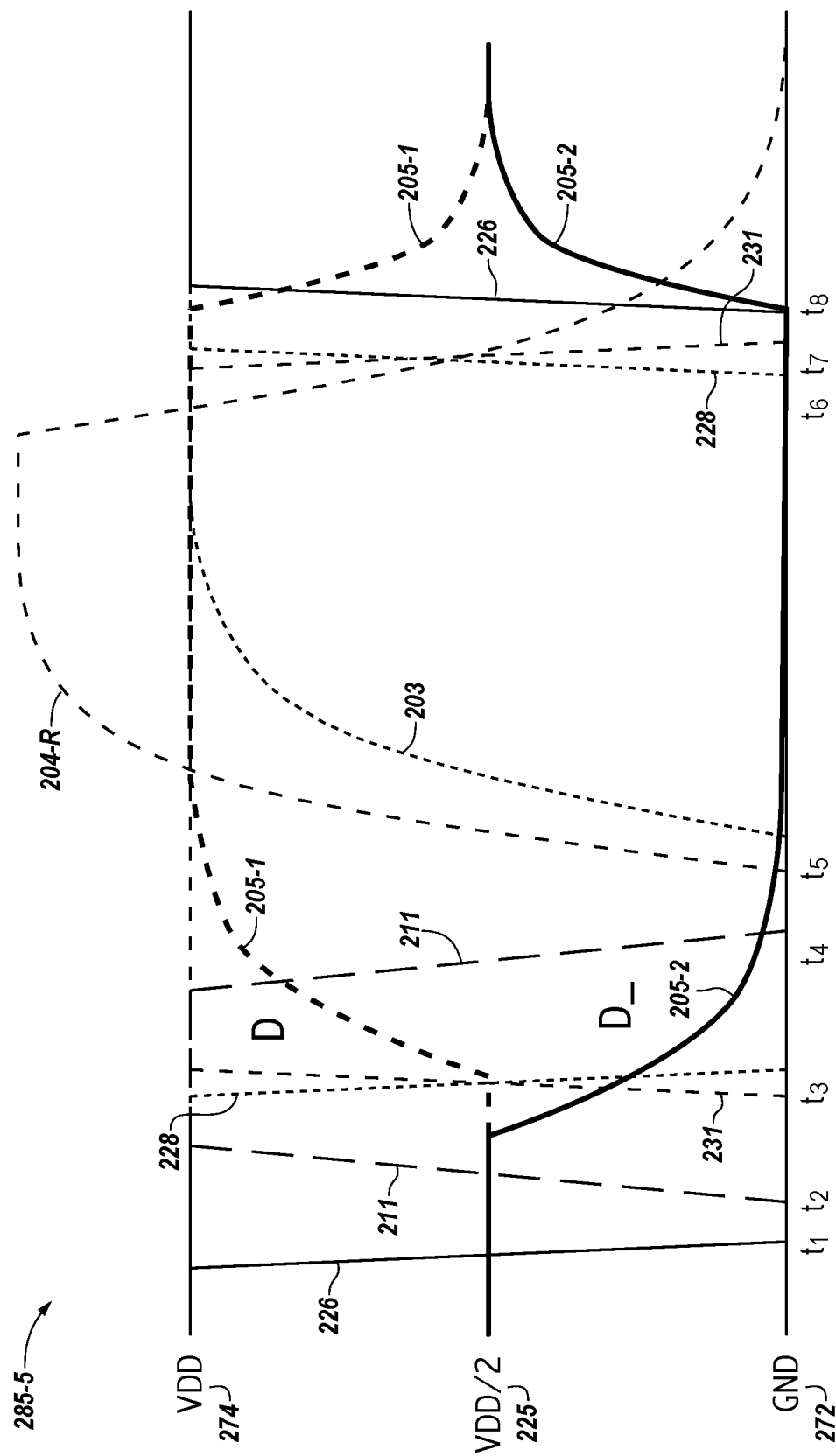

FIGS. 2D-1 and 2D-2 illustrate timing diagrams 285-4 and 285-5, respectively, associated with performing a number of logical operations using sensing circuitry in accordance with a number of embodiments of the present disclosure. Timing diagrams 285-4 and 285-5 illustrate signals (e.g., voltage signals) associated with performing a last operation phase of a logical operation (e.g., an R-input logical operation). For instance, timing diagram 285-4 corresponds to a last operation phase of an R-input NAND operation or an R-input NOR operation, and timing diagram 285-5 corresponds to a last operation phase of an R-input AND operation or an R-input OR operation. For example, performing a NAND operation can include performing the operation phase shown in FIG. 2D-1 subsequent to a number of iterations of the intermediate operation phase described in association with FIG. 2C-1, performing a NOR operation can include performing the operation phase shown in FIG. 2D-1 subsequent to a number of iterations of the intermediate operation phase described in association with FIG. 2C-2, performing an AND operation can include performing the operation phase shown in FIG. 2D-2 subsequent to a number of iterations of the intermediate operation phase described in association with FIG. 2C-1, and performing an OR operation can include performing the operation phase shown in FIG. 2D-2 subsequent to a number of iterations of the intermediate operation phase described in association with FIG. 2C-2. Table 5 shown below indicates the Figures corresponding to the sequence of operation phases associated with performing a number of R-input logical operations in accordance with a number of embodiments described herein.

TABLE 5

| Operation | FIG. 2B | FIG. 2C-1 | FIG. 2C-2 | FIG. 2D-1 | FIG. 2D-2 |
|---|---|---|---|---|---|
| AND | First phase | R-1 iterations | | | Last phase |
| NAND | First phase | R-1 iterations | | Last phase | |
| OR | First phase | | R-1 iterations | | Last phase |
| NOR | First phase | | R-1 iterations | Last phase | |

The last operation phases of FIGS. 2D-1 and 2D-2 are described in association with storing a result of an R-input logical operation to a row of the array (e.g., array 230). However, as described above, in a number of embodiments, the result can be stored to a suitable location other than back to the array (e.g., to an external register associated with a controller and/or host processor, to a memory array of a different memory device, etc., via I/O lines).

As shown in timing diagrams 285-4 and 285-5, at time equilibration is disabled (e.g., the equilibration signal 226 is deactivated) such that sense lines D and D_ are floating. At time t2, either the InvD signal 213 or the Passd and Passdb signals 211 are activated, depending on which logical operation is being performed. In this example, the InvD signal 213 is activated for a NAND or NOR operation (see FIG. 2D-1), and the Passd and Passdb signals 211 are activated for an AND or OR operation (see FIG. 2D-2).

Activating the InvD signal 213 at time t2 (e.g., in association with a NAND or NOR operation) enables transistors 214-1/214-2 and results in an inverting of the data value stored in the secondary latch as either sense line D or sense line D_ is pulled low. As such, activating signal 213 inverts the accumulated output. Therefore, for a NAND operation, if any of the memory cells sensed in the prior operation phases (e.g., the initial operation phase and one or more intermediate operation phases) stored a logic 0 (e.g., if any of the R-inputs of the NAND operation were a logic 0), then the sense line D_ will carry a voltage corresponding to logic 0 (e.g., a ground voltage) and sense line D will carry a voltage corresponding to logic 1 (e.g., a supply voltage such as VDD). For this NAND example, if all of the memory cells sensed in the prior operation phases stored a logic 1 (e.g., all of the R-inputs of the NAND operation were logic 1), then the sense line D_ will carry a voltage corresponding to logic 1 and sense line D will carry a voltage corresponding to logic 0. At time t3, the primary latch of sense amp 206 is then activated (e.g., the sense amp is fired), driving D and D_ to the appropriate rails, and the sense line D now carries the NANDed result of the respective input data values as determined from the memory cells sensed during the prior operation phases. As such, sense line D will be at VDD if any of the input data values are a logic 0 and sense line D will be at ground if all of the input data values are a logic 1.

For a NOR operation, if any of the memory cells sensed in the prior operation phases (e.g., the initial operation phase and one or more intermediate operation phases) stored a logic 1 (e.g., if any of the R-inputs of the NOR operation were a logic 1), then the sense line D_ will carry a voltage corresponding to logic 1 (e.g., VDD) and sense line D will carry a voltage corresponding to logic 0 (e.g., ground). For this NOR example, if all of the memory cells sensed in the prior operation phases stored a logic 0 (e.g., all of the R-inputs of the NOR operation were logic 0), then the sense line D_ will carry a voltage corresponding to logic 0 and sense line D will carry a voltage corresponding to logic 1. At time t3, the primary latch of sense amp 206 is then activated and the sense line D now contains the NORed result of the respective input data values as determined from the memory cells sensed during the prior operation phases. As such, sense line D will be at ground if any of the input data values are a logic 1 and sense line D will be at VDD if all of the input data values are a logic 0.

Referring to FIG. 2D-2, activating the Passd and Passdb signals 211 (e.g., in association with an AND or OR operation) transfers the accumulated output stored in the secondary latch of compute component 231 to the primary latch of sense amp 206. For instance, for an AND operation, if any of the memory cells sensed in the prior operation phases (e.g., the first operation phase of FIG. 2B and one or more iterations of the intermediate operation phase of FIG. 2C-1) stored a logic 0 (e.g., if any of the R-inputs of the AND operation were a logic 0), then the sense line D_ will carry a voltage corresponding to logic 1 (e.g., VDD) and sense line D will carry a voltage corresponding to logic 0 (e.g., ground). For this AND example, if all of the memory cells sensed in the prior operation phases stored a logic 1 (e.g., all of the R-inputs of the AND operation were logic 1), then the sense line D_ will carry a voltage corresponding to logic 0 and sense line D will carry a voltage corresponding to logic 1. At time t3, the primary latch of sense amp 206 is then activated and the sense line D now carries the ANDed result of the respective input data values as determined from the memory cells sensed during the prior operation phases. As such, sense line D will be at ground if any of the input data values are a logic 0 and sense line D will be at VDD if all of the input data values are a logic 1.

For an OR operation, if any of the memory cells sensed in the prior operation phases (e.g., the first operation phase of FIG. 2B and one or more iterations of the intermediate operation phase shown in FIG. 2C-2) stored a logic 1 (e.g., if any of the R-inputs of the OR operation were a logic 1), then the sense line D_ will carry a voltage corresponding to logic 0 (e.g., ground) and sense line D will carry a voltage corresponding to logic 1 (e.g., VDD). For this OR example, if all of the memory cells sensed in the prior operation phases stored a logic 0 (e.g., all of the R-inputs of the OR operation were logic 0), then the sense line D will carry a voltage corresponding to logic 0 and sense line D_ will carry a voltage corresponding to logic 1. At time t3, the primary latch of sense amp 206 is then activated and the sense line D now carries the ORed result of the respective input data values as determined from the memory cells sensed during the prior operation phases. As such, sense line D will be at VDD if any of the input data values are a logic 1 and sense line D will be at ground if all of the input data values are a logic 0.

The result of the R-input AND, OR, NAND, and NOR operations can then be stored back to a memory cell of array 230. In the examples shown in FIGS. 2D-1 and 2D-2, the result of the R-input logical operation is stored to a memory cell coupled to RowR (e.g., 204-R). Storing the result of the logical operation to the RowR memory cell simply involves enabling the RowR access transistor 202 by activating RowR. The capacitor 203 of the RowR memory cell will be driven to a voltage corresponding to the data value on the sense line D (e.g., logic 1 or logic 0), which essentially overwrites whatever data value was previously stored in the RowR memory cell. It is noted that the RowR memory cell can be a same memory cell that stored a data value used as an input for the logical operation. For instance, the result of the logical operation can be stored back to the Row0 memory cell or Row1 memory cell.

Timing diagrams 285-4 and 285-5 illustrate, at time t3, the positive control signal 231 and the negative control signal 228 being deactivated (e.g., signal 231 goes high and signal 228 goes low) to activate the sense amp 206. At time t4 the respective signal (e.g., 213 or 211) that was activated at time t2 is deactivated. Embodiments are not limited to this example. For instance, in a number of embodiments, the sense amp 206 may be activated subsequent to time t4 (e.g., after signal 213 or signals 211 are deactivated).

As shown in FIGS. 2D-1 and 2D-2, at time t5, RowR (204-R) is activated, which drives the capacitor 203 of the selected cell to the voltage corresponding to the logic value stored in the accumulator. At time t6, Row R is deactivated, at time t7, the sense amp 206 is deactivated (e.g., signals 228 and 231 are deactivated) and at time t8 equilibration occurs (e.g., signal 226 is activated and the voltages on the complementary sense lines 205-0/205-1 are brought to the equilibration voltage).

In a number of embodiments, sensing circuitry such as that described in FIG. 2A (e.g., circuitry formed on pitch with the memory cells) can enable performance of numerous logical operations in parallel. For instance, in an array having 16K columns, 16K logical operations can be performed in parallel, without transferring data from the array and sensing circuitry via a bus and/or without transferring data from the array and sensing circuitry via I/O lines.

Also, one of ordinary skill in the art will appreciate that the ability to perform R-input logical operations (e.g., NAND, AND, NOR, OR, etc.) can enable performance of more complex computing functions such as addition, subtraction, multiplication, and division among other primary math functions and/or pattern compare functions. For example, a series of NAND operations can be combined to perform a full adder function. As an example, if a full adder requires 12 NAND gates to add two data values along with a carry in and carry out, a total of 384 NAND operations (12×32) could be performed to add two 32 bit numbers. Embodiments of the present disclosure can also be used to perform logical operations that may be non-boolean (e.g., copy, compare, etc.).

Additionally, in a number of embodiments, the inputs to a logical operation performed may not be data values stored in the memory array to which the sensing circuitry (e.g., 150) is coupled. For instance, a number of inputs to a logical operation can be sensed by a sense amplifier (e.g., 206) without activating a row of the array (e.g., 230). As an example, the number of inputs can be received by the sense amp 206 via I/O lines coupled thereto. Such inputs may be provided to the sense amp 206 (e.g., via the appropriate I/O lines) from a source external to the array 230 such as from a host processor (e.g., host 110) and/or external controller, for instance. As another example, in association with performing a logical operation, the inputs to a particular sense amp (e.g., 206) and its corresponding compute component (e.g., 231) may be received from a different sense amp/compute component pair. For instance, a data value (e.g., logical result) stored in a first accumulator coupled to a first column of cells may be transferred to a different (e.g., neighboring) sense amp/compute component pair associated with a different column of cells, which may or may not be located in the same array as the first column.

Embodiments of the present disclosure are not limited to the particular sensing circuitry configuration illustrated in FIG. 2A. For instance, different compute component circuitry can be used to perform logical operations in accordance with a number of embodiments described herein. Although not illustrated in FIG. 2A, in a number of embodiments, control circuitry can be coupled to array 230, sense amp 206, and/or compute component 231. Such control circuitry may be implemented on a same chip as the array and sensing circuitry and/or on an external processing resource such as an external processor, for instance, and can control enabling/disabling various signals corresponding to the array and sensing circuitry in order to perform logical operations as described herein.

The example logic operation phases described in association with FIGS. 2A, 2B, 2C-1, 2C-2, 2D-1, and 2D-2 involve accumulating a data value (e.g., a data value sensed from a memory cell and/or a data value corresponding to a voltage or current of a sense line). Due to conservation of energy, the energy consumed in performing the logic operation phase is approximately equal to the energy consumed during charging of the capacitance of the sense line D or D_ from VDD/2 to VDD, which begins when the sense amp is activated (e.g., at time t3 as shown in FIGS. 2B, 2C-1, 2C-2, 2D-1, and 2D-2). As such, performing a logical operation consumes approximately the energy used to charge a sense line (e.g., digit line) from VDD/2 to VDD. In contrast, various previous processing approaches often consume at least an amount of energy used to charge a sense line from rail to rail (e.g., from ground to VDD), which may be twice as much energy or more as compared to embodiments described herein.

FIG. 3A illustrates a logical diagram showing the states of cells of a portion of an array 330 at a particular phase associated with performing a serial division operation in accordance with a number of embodiments of the present disclosure. FIG. 3A includes memory array 330 that is analogous to memory array 230 of FIG. 2A and memory array 130 of FIG. 1. Memory array 330 includes sense lines 305-0, 305-1, 305-2, 305-3, 305-4, 305-5 (e.g., referred to generally as sense lines 305). More or fewer sense lines can be included in memory array 330. Each of the sense lines 305 represents a different division operation. For example, six different division operations can be performed (e.g., in parallel) based on the values stored in a number of memory cells that are coupled to the six different sense lines.

Memory array 330 also includes select lines 304-0, 304-1, 304-2, 304-3, 304-4, 304-5, 304-6, 304-7, 304-8, 304-9, 304-10, 304-11, 304-12, 304-13, 304-14, 304-15, 304-16 (e.g., referred to generally as select lines 304). In FIG. 3A, a first division operation can consist of the dividend value 320-0 being divided by the divisor value 322-0. The results of the first division operation can be stored in the quotient value 324-0 and the remainder value 326-0. A second division operation can consist of the dividend value 320-1 being divided by the divisor value 322-1. The results of the second division operation can be stored in the quotient value 324-1 and the remainder value 326-1. A third division operation can consist of the dividend value 320-2 being divided by the divisor value 322-2. The results of the third division operation can be stored in the quotient value 324-2 and the remainder value 326-2. A fourth division operation can consist of the dividend value 320-3 being divided by the divisor value 322-3. The results of the fourth division operation can be stored in the quotient value 324-3 and the remainder value 326-3. A fifth division operation can consist of the dividend value 320-4 being divided by the divisor value 322-4. The results of the fifth division operation can be stored in the quotient value 324-4 and the remainder value 326-4. A sixth division operation can consist of the dividend value 320-5 being divided by the divisor value 322-5. The results of the sixth division operation can be stored in the quotient value 324-5 and the remainder value 326-5.

The dividend values 320-0, 320-1, 320-2, 320-3, 320-4, 320-5 (e.g., referred to generally as dividend values 320), the divisor values 322-0, 322-1, 322-2, 322-3, 322-4, 322-5 (e.g., referred to generally as divisor values 322), the quotient values 324-0, 324-1, 324-2, 324-3, 324-4, 324-5, and the remainder values 326-0, 326-1, 326-2, 326-3, 326-4, 326-5 can be stored as bit-vectors in the memory cells that are coupled to the select lines 304, and the sense lines 305. For example, a dividend value 320-0 that is stored in a number of memory cells can have a value equal to five. The dividend value 320-0 can be represented by the bit-vector [0101] that can be stored in the memory cells that are coupled to the sense line 320-0 and the select lines 304-0, 304-1, 304-2, 304-3.

FIG. 3A, shows the initial states of the memory cells in the memory array 330. For example, the memory cells that store the quotient values and the remainder values can be initialized with bit-vector [0000] which represents a value of zero. The memory cells that store dividend value 320-0 are initialized to store bit-vector [0101]. The dividend value 320-0 is equal to five. The memory cells that store dividend value 320-1 are initialized to store bit-vector [0111]. The dividend value 320-1 is equal to seven. The memory cells that store dividend value 320-2 are initialized to store bit-vector [0011]. The dividend value 320-2 is equal to three. The memory cells that store dividend value 320-3 are initialized to store bit-vector [0110]. The dividend value 320-3 is equal to six. The memory cells that store dividend value 320-4 are initialized to store bit-vector [1000]. The dividend value 320-4 is equal to eight. The memory cells that store dividend value 320-5 are initialized to store bit-vector [1100]. The dividend value 320-5 is equal to twelve.

The memory cells that store divisor value 322-0 are initialized to store bit-vector [0100]. The stored divisor value 322-0 is equal to four. The memory cells that store divisor value 322-1 are initialized to store bit-vector [0010]. The divisor value 322-1 is equal to two. The memory cells that store divisor value 322-2 are initialized to store bit-vector [0001]. The divisor value 322-2 is equal to one. The memory cells that store divisor value 322-3 are initialized to store bit-vector [0011]. The divisor value 322-3 is equal to three. The memory cells that store divisor value 322-4 are initialized to store bit-vector [0101]. The divisor value 322-4 is equal to five. The memory cells that store divisor value 322-5 are initialized to store bit-vector [0110]. The divisor value 322-5 is equal to six.

FIG. 3A also includes masks 328-0, 328-1, 328-2, 328-3, 328-4, 328-5 (e.g., referred to generally as masks 328). Masks 328 are further described in FIG. 3C.

FIGS. 3B through 3K illustrate logical diagrams showing the states of memory cells of array portion 330 during different phases (e.g., after computations) associated with performing a division operation in accordance with a number of embodiments of the present disclosure. FIG. 3A illustrates the original (e.g., initialized) states of the memory cells of array portion 330.

FIG. 3B illustrates a logical diagram showing the states of the cells of array portion 330 at a particular phase associated with performing a division operation (e.g., at a phase subsequent to that shown in FIG. 3A).

A first computation in performing the division operation is to copy the bits stored in memory cells associated with a fourth index of the bit vectors representing the dividend values 320 to the memory cells associated with a first index of the bit vectors representing the remainder value 326. For example, a bit (e.g., 0) stored in the memory cell, that is coupled to sense line 305-0 and select line 304-3 of FIG. 3A, of the memory cells that stores the dividend value 320-0, is copied to a memory cell that is coupled to sense line 305-0 and select line 304-12 of the memory cells that store the remainder value 326-0. A bit (e.g., 0) stored in the memory cell, that is coupled to sense line 305-1 and select line 304-3 of FIG. 3A, of the memory cells that store the dividend value 320-1, is copied to a memory cell that is coupled to sense line 305-1 and select line 304-12 of the memory cells that store the remainder value 326-1. A bit (e.g., 0) stored in the memory cell, that is coupled to sense line 305-2 and select line 304-3 of FIG. 3A, of the memory cells that store the dividend value 320-1, is copied to a memory cell that is coupled to sense line 305-2 and select line 304-12 of the memory cells that store the remainder value 326-2. A bit (e.g., 0) stored in the memory cell, that is coupled to sense line 305-3 and select line 304-3 of FIG. 3A, of the memory cells that store the dividend value 320-3, is copied to a memory cell that is coupled to sense line 305-3 and select line 304-12 of the memory cells that store the remainder value 326-3. A bit (e.g., 1) stored in the memory cell, that is coupled to sense line 305-4 and select line 304-3 of FIG. 3A, of the memory cells that store the dividend value 320-4, is copied to a memory cell that is coupled to sense line 305-4 and select line 304-12 of the memory cells that store the remainder value 326-4. A bit (e.g., 1) stored in the memory cell, that is coupled to sense line 305-5 and select line 304-3 of FIG. 3A, of the memory cells that store the dividend value 320-5, is copied to a memory cell that is coupled to sense line 305-5 and select line 304-12 of the memory cells that store the remainder value 326-5. Accordingly, after the copy operation, the bit vectors representing the remainder values 326-0, . . . 326-5 have been updated to [0000], [0000], [0000], [0000], [0001], and [0001], respectively, representing updated remainder values of 0, 0, 0, 0, 1 and 1, respectively.

FIG. 3C illustrates a logical diagram showing the states of the cells of array portion 330 at a particular phase associated with performing a division operation (e.g., at a phase subsequent to that shown in FIG. 3B).

In FIG. 3C a number of masks 328 are created. As used herein, a mask can be a mask that is created after comparing two values (e.g., comparing a dividend value with a remainder value) and/or a mask that is created after comparing a number of values. For example, a mask 328-0 can indicate a result of a comparison of divisor value 322-0 and remainder value 326-0. A mask 328-1 can indicate a result of a comparison of divisor value 322-1 and remainder value 326-1. A mask 328-2 can indicate a result of a comparison of divisor value 322-2 and remainder value 326-2. A mask 328-3 can indicate a result of a comparison of divisor value 322-3 and remainder value 326-3. A mask 328-4 can indicate a result of a comparison of divisor value 322-4 and remainder value 326-4. A mask 328-5 can indicate a result of a comparison of divisor value 322-5 and remainder value 326-5. A comparison can determine whether a divisor value is less than or equal to a remainder value. The memory cells that store the masks 328-0, 328-1, 328-2, 328-3, 328-4, 328-5 (e.g., referred to generally as masks 328) can be set to zero when a divisor value is greater than a remainder value and are set to one when the divisor value is less than or equal to the remainder value. The masks 328 in FIG. 3C are all set to zero because none of the divisor values 322 are less than or equal to the remainder values 326. For example, the memory cell of mask 328-5 is set to zero because divisor value 322-5 (e.g., 6) is greater than remainder value 326-5 (e.g., 1).

FIG. 3D illustrates a logical diagram showing the states of the cells of array portion 330 at a particular phase associated with performing a division operation (e.g., at a phase subsequent to that shown in FIG. 3C).

In FIG. 3D, the logical representations (e.g., bit vectors) of quotient values 324 that are associated with the masks 328 that have a value equal to zero are shifted to update the quotient values. That is, the logical representation of quotient values 324 are shifted because the divisor values 322 are greater than the remainder values 326. In a number of examples, a shift can also be expressed as a left shift and/or a down shift. A shift can involve the copying of a bit stored in a memory cell to a different memory cell associated with a larger index than the memory cell where the bit was originally stored. For example, a shift occurs when the bit (e.g., 0) that is stored in a memory cell that is coupled to sense line 305-0 and select line 304-8 is copied to a memory cell that is coupled to sense line 305-0 and select line 304-9. In the above example, the memory cell that is coupled to sense line 305-0 and select line 304-8 is associated with an index equal to one which is lower than an index equal to two which is associated with the memory cell that is coupled to sense line 305-0 and select line 304-9.

FIG. 3E illustrates a logical diagram showing the states of the cells of array portion 330 at a particular phase associated with performing a division operation (e.g., at a phase subsequent to that shown in FIG. 3D).

In FIG. 3E, the logical representation of all of the remainder values 324 are also shifted (to update the remainder values 324) because the masks 328 all have a value equal to zero. For example, the bits stored in the memory cells coupled to sense line 305-4 and select lines 304-12 to 304-15 are shifted to memory cells coupled to sense line 305-4 and select lines 304-13 to 304-16. The bit stored in the memory cell coupled to sense line 305-4 and select line 304-12 is shifted (e.g., copied) to the memory cell coupled to sense line 305-4 and select line 304-13. The memory cell coupled to sense line 305-4 and select line 304-12 is vacated by setting the bit stored in the memory cell equal to zero. By virtue of the shift (e.g., from bit vector [0001] to bit vector [0010], the remainder values 326-4 and 326-5 are updated to have a value of two (2)).

This is the end of a first iteration of the division operation. A second iteration of the division operation (not shown in FIGS. 3A-3K) includes copying the bits stored in memory cells that are coupled to sense line 305-0 to sense line 305-5 and select line 304-2 to the memory cells that are coupled to sense line 305-0 to sense line 305-5 and select line 304-12. The second iteration can also include recreating the mask. The second iteration can include determining whether the mask has a value equal to one or zero. The second iteration can include subtracting the divisor value from the remainder value and storing a logical representation of the result as the remainder value if it is determined that the mask has a value equal to one. If the mask has a value equal to one (1), then the logical representation (bit vector) of the quotient value is shifted and incremented by one (1) to update the quotient value. If the mask has a value equal to one (1) and if the memory cells that are coupled to sense line 305-0 to sense line 305-5 and select line 304-2 do not have a first index, then the logical representation of the result of the subtraction operation is shifted to update the remainder value.

FIG. 3F illustrates a logical diagram showing the states of the cells of array portion 330 at a particular phase associated with performing a division operation (e.g., at a phase subsequent to that shown in FIG. 3E).

In FIG. 3F the bits stored in memory cells associated with a first index of the bit vectors that represent the dividend values 320 are copied to memory cells associated with a first index of the bit-vectors that represent the remainder values 326. For example, the bits stored in the memory cells coupled to the sense line 320-0 to sense line 320-5 and select line 304-0 are copied to the memory cells coupled to the sense line 320-0 to sense line 320-5 and select line 304-12.

FIG. 3G illustrates a logical diagram showing the states of the cells of array portion 330 at a particular phase associated with performing a division operation (e.g., at a phase subsequent to that shown in FIG. 3F).

In FIG. 3G, the masks 328 have been re-created. For example, mask 328-0 is equal to one because the divisor value 322-0 (e.g., four) is less than the remainder value 326-0 (e.g., five). Mask 328-3 is equal to zero because the divisor value 322-3 (e.g., three) is greater than the remainder value 326-6 (e.g., zero).

FIG. 3H illustrates a logical diagram showing the states of the cells of array portion 330 at a particular phase associated with performing a division operation (e.g., at a phase subsequent to that shown in FIG. 3G).

In FIG. 3H, the divisor values 322 has been subtracted from the remainder values 326 where the associated mask was equal to 1. For example, the divisor value 322-0 (e.g., four) was subtracted from the remainder value 326-0 (e.g., five) in FIG. 3G and the result was stored in the memory cells that store the remainder value 326-0 (e.g., 1) as illustrated in FIG. 3H. Similarly, the divisor value 322-4 (e.g., 5) was subtracted from the remainder value 326-4 (e.g., eight) in FIG. 3G and the result of the subtraction was stored in memory cells that store the remainder value 326-4 (e.g., 3) in FIG. 3H. However, the divisor value 322-3 and divisor value 322-5 were not subtracted from the remainder value 326-3 and 326-5 because the associated mask 328-3 and mask 328-5 were equal to zero.

FIG. 3I illustrates a logical diagram showing the states of the cells of array portion 330 at a particular phase associated with performing a division operation (e.g., at a phase subsequent to that shown in FIG. 3H).

In FIG. 3I, the logical representation of the quotient values 324-0, 324-1, 324-2, and 324-4 have been left shifted and incremented by one because the corresponding masks 328-0, 328-1, 328-2, and 324-4 were equal to one. For example, the bits stored in the memory cells that store the quotient value 324-1 (e.g., one) in FIG. 3H are shifted down to temporarily update the quotient value to a value of two. In FIG. 3I, the logical representation of the quotient value 324-1 (e.g., temporarily two) has been incremented by one to provide the quotient value in FIG. 3I with an updated value equal to three.

In FIG. 3I, the logical representation of remainder values 326-0, 326-1, 326-2, 326-4 are not shifted even through associated mask values 328-0, 328-1, 328-2, 328-4 are equal to one because the bits copied in FIG. 3F where copied from memory cells that are connected to sense line 320-0 to sense line 320-5 and select line 304-0 that have an index equal to one. That is, there are no more bits to copy and the remainder values 326-0, 326-1, 326-2, 326-4 are the final remainder values of the division operation. Likewise the quotient values 324-0, 324-1, 324-2, 324-4 are the final quotient values of the division operation.

However, the logical representation of the quotient values and the remainder values that are associated with masks having a value equal to zero will be shifted, as shown in FIG. 3J and FIG. 3K.

FIG. 3J illustrates a logical diagram showing the states of the cells of array portion 330 at a particular phase associated with performing a division operation (e.g., at a phase subsequent to that shown in FIG. 3I).

In FIG. 3J, the logical representation of quotient values 324-3, 324-5 are left shifted. For example, quotient values 324-3, 324-5 in FIG. 3I had a value equal to one before they are left shifted and a value equal to two after they are left shifted.

FIG. 3K illustrates a logical diagram showing the states of the cells of array portion 330 at a particular phase associated with performing a division operation (e.g., at a phase subsequent to that shown in FIG. 3J).

In FIG. 3K, the logical representation of the remainder values 326-3, 326-5 are left shifted. For example, remainder values 326-3, 326-5 in FIG. 3J had a value equal to zero before they are left shifted and a value equal to zero after they are left shifted. The shifting has no effect on the remainder values 326-3, 326-5 because the remainder values are equal to zero before the shifting and as a result a shift in the zero bits of the remainder values does not affect the remainder values.

CONCLUSION

The present disclosure includes devices and methods for sense line division. An example apparatus comprising a first address space of a memory array comprising a first number of memory cells coupled to a sense line and to a first number of select lines wherein the first address space stores a dividend value. A second address space of the memory array comprising a second number of memory cells coupled to the sense line and to a second number of select lines wherein the second address space stores a divisor value. A third address space of the memory array comprising a third number of memory cells coupled to the sense line and to a third number of select lines wherein the third address space stores a remainder value. Sensing circuitry can be configured to receive the dividend value and the divisor value, divide the dividend value by the divisor value, and store a remainder result of a division in the third number of memory cells.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
   a host; and
   a memory device coupled to the host and configured to:
   receive, from the host, an instruction to perform a division operation on a divisor value and a dividend value stored in an array of memory cells of the memory device, wherein the divisor value is stored in a first group of memory cells of the array coupled to a sense line of the array and the dividend value is stored in a second group of memory cells of the array coupled to the sense line; and
   operate sensing circuitry coupled to the array to perform the division operation by performing N number of iterations without transferring data from the memory device to the host;
   wherein the memory device is, in a first iteration, configured to compare a remainder value stored in a third group of memory cells coupled to the sense line with the divisor value, wherein a first memory cell of the third group of memory cells stores a value corresponding to a bit stored in a Nth memory cell of the first group of memory cells.

2. The system of claim 1, wherein the memory device is configured to provide a result of the division operation to the host.

3. The system of claim 1, wherein the host comprises a number of processors that are external to the memory device and coupled thereto via a bus.

4. The system of claim 1, wherein:
   the sense line is one of a plurality of sense lines coupled to the array of memory cells; and
   the memory device is a processor-in-memory device configured to operate the sensing circuitry to perform serial division on a per column basis, wherein each column of the array corresponds to a respective one of the plurality of sense lines.

5. The system of claim 4, wherein the memory device comprises a controller configured to operate the sensing circuitry.

6. The system of claim 1, wherein the memory device is configured to copy, prior to the comparison of the remainder value with the divisor value, the bit stored in the Nth memory cell of the first portion into the first memory cell of the third portion.

7. A system, comprising:
   a host; and
   a memory device coupled to the host and comprising:
   a memory array comprising:
   a first group of memory cells configured to store a dividend value; and
   a second group of memory cells configured to store a divisor value, wherein the first group of memory cells and the second group of memory cells are coupled to a particular sense line of the memory array;
   control circuitry configured to execute an instruction received from the host to perform a division operation on the dividend value and the divisor value via N number of iterations, wherein the control circuitry is, in a first iteration, configured to compare the divisor value with a remainder value stored in a third group of memory cells whose first memory cell stores a value corresponding to a bit stored in a Nth memory cell of the first group of memory cells;
   wherein the division operation is performed without transferring data from the memory device to the host.

8. The system of claim 7, wherein the third group of memory cells is coupled to the particular sense line of the array to which the first group of memory cells and the second group of memory cells are coupled.

9. The system of claim 7, wherein the control circuitry is configured to:
   update the remainder value based on the comparison performed during the first iteration; and
   compare, in a second iteration, the divisor values with the updated remainder value stored in the third group of memory cells whose first memory cells stores a value corresponding to a bit stored in a Nth-1 memory cell of the first group of memory cells.

10. The system of claim 9, wherein the control circuitry being configured to update the remainder value based on the comparison performing during the first iteration comprises the control circuitry being configured to:
    if the divisor value is determined to be, as a result of the comparison, less than or equal to the remainder value:
    subtract the divisor value from the remainder value and store a resulting value as the remainder value in the third group of memory cells;

shift and increment a logical representation of a quotient value stored in a fourth group of memory cells, wherein the fourth group of memory cells is coupled to the particular sense line of the array to which the first group of memory cells and the second group of memory cells are coupled; and shift a logical representation of the remainder value to update the remainder value.

11. The system of claim 9, wherein the control circuitry being configured to update the remainder value based on the comparison performing during the first iteration comprises the control circuitry being configured to:

if the divisor value is determined to be, as a result of the comparison, greater than the remainder value:

shift a logical representation of a quotient value stored in a fourth group of memory cells to update a quotient value, wherein the fourth group of memory cells is coupled to the particular sense line of the array to which the first group of memory cells and the second group of memory cells are coupled; and shift a logical representation of the remainder value to update the remainder value.

12. The system of claim 7, wherein the dividend value and the divisor value are stored in the array as bit-vectors.

13. The system of claim 7, wherein the system comprises a server.

14. The system of claim 7, wherein the control circuitry comprises a state machine.

15. The system of claim 7, wherein the control circuitry comprises a sequencer.

16. The system of claim 7, wherein the host and the memory device are located on a same integrated circuit.

17. A method of operating a system, comprising:

receiving at a memory device comprising an array of memory cells, and from a host, an instruction to perform a division operation on a dividend value and a divisor value, wherein a first group of memory cells of the array are configured to store the dividend value and comprise at least N number of memory cells corresponding to a particular column of memory cells of the array, wherein the divisor value is stored in a second group of memory cells corresponding to the particular column of memory cells;

executing the received instruction using sensing circuitry of the memory device to determine a result of the division operation by comparing the divisor value with a remainder value stored in a third group of memory cells corresponding to the particular column of memory cells, wherein a first memory cell the third group stores a value corresponding to a bit stored in a Nth memory cell of the first group of memory cells, wherein the result of the division operation is determined without transferring data to the host; and providing the result of the division operation to the host.

18. The method of claim 17, wherein the result of the division operation being determined without transferring data to the host comprises determining and storing the result back to the array without transferring data external to the array and external to sensing circuitry coupled thereto via a local input/output (I/O) line.

19. The method of claim 17, wherein the host comprises a processor external to the memory device and coupled thereto via a bus, and wherein the method includes providing the result to the processor.

* * * * *